United States Patent
Athreyapurapu et al.

(10) Patent No.: US 10,999,219 B1
(45) Date of Patent: May 4, 2021

(54) AUTOMATED PACKET SWITCH TYPE AND HOST SELECTION FOR EFFICIENT VIRTUALIZED NETWORK FUNCTION SERVICE CHAINING

(71) Applicant: Juniper Networks, Inc., Sunnyvale, CA (US)

(72) Inventors: Venkata Rajasekharu Athreyapurapu, Bangalore (IN); Vijayakumar Bangalore Subbarao, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 420 days.

(21) Appl. No.: 15/627,088

(22) Filed: Jun. 19, 2017

(51) Int. Cl.
*H04L 12/931* (2013.01)
*H04L 12/46* (2006.01)
*H04L 12/24* (2006.01)

(52) U.S. Cl.
CPC .......... *H04L 49/70* (2013.01); *H04L 12/4641* (2013.01); *H04L 41/0806* (2013.01); *H04L 49/354* (2013.01)

(58) Field of Classification Search
CPC .......... H04L 49/00; H04L 12/00; H04L 41/00
See application file for complete search history.

(56) References Cited

U.S. PATENT DOCUMENTS

2014/0317261 A1* 10/2014 Shatzkamer ........ G06F 9/45558 709/223
2015/0281118 A1* 10/2015 Banavalikar ........ H04L 12/4633 370/397
2016/0308790 A1* 10/2016 Jiang ....................... H04L 49/70
2017/0180273 A1* 6/2017 Daly ..................... H04L 69/324
2018/0287966 A1* 10/2018 Kamath .............. G06F 9/45558

OTHER PUBLICATIONS

U.S. Appl. No. 15/394,215, by Juniper Networks, Inc. (Inventors: Athreyapurapu et al.), Filed Dec. 29, 2016.
"Group Specification—Network Functions Virtualisation (NFV); Management and Orchestration," ETSI GS NFV-MAN 001 v1.1.1, Dec. 2014, 184 pp.
Popoviciu et al., "IPv6 Benchmarking Methodology for Network Interconnect Devices," RFC 5180, May 2008, 20 pp.

(Continued)

*Primary Examiner* — Andrew Lai
*Assistant Examiner* — Sumitra Ganguly
(74) *Attorney, Agent, or Firm* — Shumaker & Sieffert, P.A.

(57) ABSTRACT

In general, techniques are described for selecting types of switches and corresponding input/output methods for virtualized network functions (VNFs) of a network service and selecting one or more host computing devices to host the VNFs for the network service to realize the selected types of switches and corresponding input/output methods for the VNFs. For example, a controller that performs aspects of NFV management and orchestration (MANO) receives requirements for a network service to be provisioned in the NFVI. Based on the requirements for the network service, which may specify one or VNFs and may specify individual requirements for each VNF, the controller selects a type of switch and corresponding input/output method for each VNF.

23 Claims, 16 Drawing Sheets

(56) References Cited

OTHER PUBLICATIONS

"Operation, administration and maintenance (OAM) functions and mechanisms for Ethernet-based networks—Recommendation ITU-T G.8013/Y.1731," Telecommunication Standardization Sector of ITU—International Telecommunication Union, Aug. 2015, 102 pp.
Bradner et al., "Benchmarking Methodology for Network Interconnect Devices," RFC 2544, Network Working Group, Mar. 1999, 31 pp.

* cited by examiner

| Node 1 | Node 2 | Cost |
|--------|--------|------|
| A1B1H1 | A1B1H2 | 5 |
| A1B1H1 | A1B2H3 | 15 |
| A1B2H3 | A1B2H4 | 6 |
| A1B1H2 | A1B2H3 | 18 |
| A1B1H1 | A1B2H4 | 16 |
| A1B1H2 | A1B2H4 | 17 |
| A2B3H5 | A2B3H6 | 5 |
| A1B1H1 | A2B3H5 | 55 |
| A1B1H2 | A2B3H5 | 54 |
| A1B2H3 | A2B3H5 | 52 |
| A1B2H4 | A2B3H5 | 53 |
| A1B1H1 | A2B3H6 | 55 |
| A1B1H2 | A2B3H6 | 54 |
| A1B2H3 | A2B3H6 | 52 |
| A1B2H4 | A2B3H6 | 53 |

| Requirement | SR-IOV | Open Virtual Switch with Data Plane Development Kit | Standard Open Virtual Switch / Linux bridges |
|---|---|---|---|
| Maximum throughput to an individual VM | Maximum of all solutions. Near to the native throughput. I/O directly delivered to the VM. | 12 times better than standard Open Virtual Switch / Linux bridges. Comparable with SR-IOV | < 1 Mbps |
| Maximum throughput from VM to VM | Limited by NIC internal switching and PCIe bandwidth | Scalable with additional cores to switching | < 1 Mbps |
| VM live migration | VM tied to specific hardware port | Link bonding and vhost migration available | Supported |
| VM abstracted from hardware | VM requires SR-IOV driver | VM requires DPDK driver to use DPDK | Supported (by default) |
| Security | VNF to VNF packets go through the NIC. Firewall filtering and other security may not be possible. | VNF to VNF packets go through the Open Virtual Switch. Security policies can be applied. | Security policies can be applied (by default) |

FIG. 8

AUTOMATED PACKET SWITCH TYPE AND HOST SELECTION FOR EFFICIENT VIRTUALIZED NETWORK FUNCTION SERVICE CHAINING

TECHNICAL FIELD

The disclosure relates to computer networks and, more specifically, to virtualized network functions for application to data traffic.

BACKGROUND

A computer network is composed of a set of nodes and a set of links that connect one node to another. For instance, a computer network may be composed of a set of routers while the set of links may be paths between the routers. When a first node in the network sends data traffic to a second node in the network, the message may pass through many links and many nodes. The set of links and nodes that the message passes through while traveling from the first node to the second node is referred to as a path through the network.

Software-defined networking (SDN) and Network Functions Virtualization (NFV) have revolutionized the traditional communication network architectures and have transformed the way communication service providers (CSPs) design their network infrastructure and services. NFV is a network architecture concept that uses the technologies of Information Technology virtualization to virtualize entire classes of network functions into building blocks that can be connected, or chained together, to create communication services.

SDN and NFV use standard virtualization technologies to virtualize entire classes of network functions that can be connected or chained together to create network services. The initial interest in introducing SDN and NFV into communication services has been driven by the desire to lower capital costs by replacing dedicated network hardware with generic x86 platforms, and to lower operating costs by leveraging cloud automation tools. As the revolution has progressed, focus has shifted towards a foundational transformation in managed communication services, a migration toward a telecommunication (telco) cloud, and the emergence of distributed virtualized infrastructures.

The NFV architecture includes multiple virtualized network functions (VNFs). A network operator may deploy NFV Infrastructure in the form of one or more computing devices to apply, to data traffic traversing a computer network, network services such as firewall, carrier grade network address translation (CG-NAT), performance enhancement proxies for video, transport control protocol (TCP) optimization and header enrichment, caching, and load balancing. Each of these network services may be referred to as a network function and may be performed by a virtualized network function, which may executed by one or more virtual machines, containers, or other execution environment of the NFV Infrastructure. In this way, virtualized network functions may be executed by servers, switches, storage devices, and cloud computing infrastructure, instead of having custom hardware appliances for each network function.

SUMMARY

In general, techniques are described for selecting types of switches and input/output methods for virtualized network functions (VNFs) of a network service and selecting one or more host computing devices to host the VNFs for the network service to realize the selected input/output methods for the VNFs. VNFs provisioned within network function virtualization infrastructure (NFVI) may use any one of a variety of internal packet switches and corresponding input/output methods offered by host computing devices of the NFVI, provided the VNF has the capability to use the input/output method. The host computing devices at least in some cases have heterogenous types of packet switches and input/output method capabilities, and some input/output methods may utilize exhaustible input/output resources to support VNFs provisioned to the host computing devices.

As described herein, a controller that performs aspects of NFV management and orchestration (MANO) receives requirements for a network service to be provisioned in the NFVI. Based on the requirements for the network service, which may specify one or VNFs and individual requirements for each VNF, the controller selects a type of switch and corresponding input/output method for each VNF. Based on data describing the types of switches and resources available at each host computing device of the NFVI, the controller then attempts to select a host computing device that can support all the VNFs with the determined types of switches to host all VNFs of the network service. If such a host computing device is present in the NFVI, the controller provisions the selected host computing device with the VNFs with the input/output methods determined for the VNFs to use the corresponding selected types of switches. The selected host computing device applies the network service, as provisioned by the controller, to data traffic mapped to the network service and delivered to the selected host computing device. The techniques may increase throughput of a network service by provisioning VNFs with input/output methods selected to account for switching performance, between VNFs in a network service, for different switching types within host computing devices, while still meeting constraints for VNF portability, migration, and security. As a result, the NFVI may provide better data path performance to data traffic processed by network services.

In one example, a method includes: obtaining, by a controller for network function virtualization infrastructure (NFVI), network description data indicating, for each computing device of a plurality of computing devices of the NFVI, one or more types of switches for virtual network packet switching available at the computing device; receiving, by the controller, a network service descriptor that specifies a plurality of virtualized network functions (VNFs); selecting, by the controller for each VNF of the plurality of VNFs, a type of switch to be used to switch packets sent by or to be received by the VNF, wherein the type of switch is selected from a plurality of different types of switches that each applies a different switching method and are available at at least one the plurality of computing devices of the NFVI; and configuring, by the controller based at least in part on the network description data, one or more computing devices to execute the plurality of VNFs and configuring the one or more of the computing devices to use the type of switch selected for each VNF of the plurality of VNFs.

In another example, a controller for network function virtualization infrastructure (NFVI) includes one or more processors operably coupled to a memory and configured to: obtain, for network function virtualization infrastructure (NFVI), network description data indicating, for each computing device of a plurality of computing devices of the NFVI, one or more types of switches for virtual network packet switching available at the computing device; receive a network service descriptor that specifies a plurality of virtualized network functions (VNFs); select, for each VNF of the plurality of VNFs, a type of switch to be used to switch packets sent by or to be received by the VNF, wherein the type of switch is selected from a plurality of different types of switches that each applies a different switching method and are available at at least one the plurality of computing devices of the NFVI; and configure, based at least in part on the network description data, one or more computing devices to execute the plurality of VNFs and configure the one or more of the computing devices to use the type of switch selected for each VNF of the plurality of VNFs.

In another example, a non-transitory computer-readable storage medium includes instructions for causing one or more processors of a controller to: obtain, for network function virtualization infrastructure (NFVI), network description data indicating, for each computing device of a plurality of computing devices of the NFVI, one or more types of switches for virtual network packet switching available at the computing device; receive a network service descriptor that specifies a plurality of virtualized network functions (VNFs); select, for each VNF of the plurality of VNFs, a type of switch to be used to switch packets sent by or to be received by the VNF, wherein the type of switch is selected from a plurality of different types of switches that each applies a different switching method and are available at at least one the plurality of computing devices of the NFVI; and configure, based at least in part on the network description data, one or more computing devices to execute the plurality of VNFs and configure the one or more of the computing devices to use the type of switch selected for each VNF of the plurality of VNFs.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

FIG. 5 is a table of inter-host communication costs, according to techniques described herein.

FIG. 8 is a table describing characteristics of different types of switching provided by network virtualization function infrastructure.

Like reference characters denote like elements throughout the description and figures.

DETAILED DESCRIPTION

Figure 1:
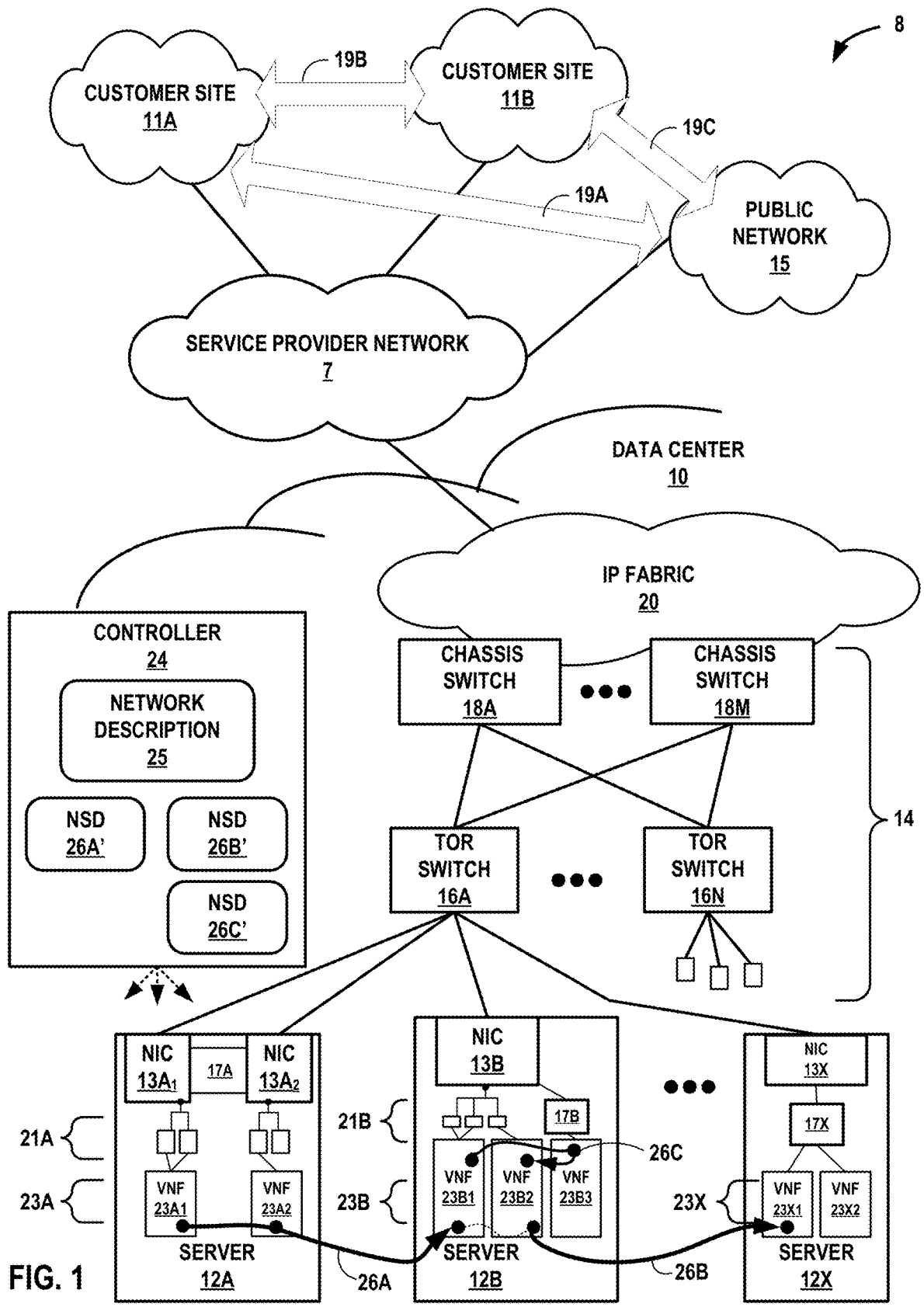
FIG. 1 is a block diagram illustrating an example network system having a data center in which examples of the techniques described herein may be implemented.

FIG. 1 is a block diagram illustrating an example network system 8 having a data center 10 in which examples of the techniques described herein may be implemented. In general, data center 10 provides an operating environment for applications and services for a customer having customer sites 11A-11B (collectively, "customer sites 11") coupled to the data center by service provider network 7. Data center 10 may, for example, host infrastructure equipment, such as networking and storage systems, redundant power supplies, and environmental controls. Service provider network 7 is coupled public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via high-speed switch fabric 14 provided by one or more tiers of physical network switches and routers, with servers 12A-12X (herein, "servers 12") depicted as coupled to top-of-rack switch 16A. Servers 12 may also be referred to herein as "hosts" or "host devices" or "host computing devices." Although only servers coupled to TOR switch 16A are shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine) switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

Servers 12 each includes at least one network interface card (NIC) 13, which each includes at least one interface to exchange packets with TOR switches 16 over a communication link. Server 12A includes multiple NICs 13A$_1$, 13A$_2$ (collectively, "NICs 13A") each having a physical port coupled to a communication link coupled to TOR switch 16A. NICs 13A and other NICs 13 may represent a dual-, quad-, or other multi-port NIC, or multiple separate NIC devices. Any of servers 12 may include one or more NICs 13.

Each server of servers 12 may include one or more internal switches for switching packets between VNFs 23 hosted by the server. For example, each NIC 13 may include a switch for switching packets among virtual hardware components and among virtual hardware components and the physical hardware component of the NIC 13, such as among virtual functions and physical functions of the NIC 13 for Single Root I/O Virtualization (SR-IOV). Besides NIC-based switches, servers 12 may include one or more switches 17.

For example, host switch 17A of server 12A is configured to switch packets between respective VNFs associated with NICs 13A$_1$, 13A$_2$. In this way, packets transported between VNFs 23 each hosted by server 12A may avoid traversing TOR switch 16A. In some examples, host switch 17A is a hardware switch to connect virtual functions of two or more SR-IOV cards (e.g., NICs 13A$_1$, 13A$_2$) of the same server 12A. The hardware switch may include, for instance, a packet forwarding engine connected to each of NICs 13A$_1$, 13A$_2$ by a high-bandwidth channel for inter-VNF forwarding. The high-bandwidth channel may be configurable as layer 2 or layer 3 ports.

Server 12B includes host switch 17B, and server 12X includes host switch 17X. In some examples, host switches 17 may represent a bus switch, a virtual switch that allows virtual machines operating on the same server 12A to exchange packets, a Linux virtio bridge, and Open vSwitch (OVS), an OVS with Data Plane Development Kit (DPDK) enabled, another virtual switch (such as an Ethernet switch) implemented in a server 12A hypervisor domain to interconnect virtual NICs of virtual machines hosted by server 12A with each other and with the physical NIC(s) 13, other switching device or software to switch packets between virtualized network functions 23 hosted by server 12A. Each of the above examples of switch implementations is a type of switch (or "packet switch type") for virtual network packet switching. A NIC-based switch for switching among virtual hardware components and among virtual hardware components and the physical hardware component of the NIC is also a type of switch.

Each of servers 12 may include one or more different types of switch for switching packets among VNFs 23. For example, server 12B may execute both a Linux virtio bridge and a standard OVS switch. Server 12X may execute a Linux virtio bridge, a standard OVS switch, and NIC-based SR-IOV switching.

Each of virtualized network functions (VNFs) 23 hosted by any of servers 12 is a software implementation of a network function. Whereas a physical network function refers to a dedicated appliance to perform the corresponding network function, a virtualized network function may be deployed to network function virtualization infrastructure (NFVI) such as servers 12, which may each represent a compute server, switch, or storage server. For example, each of servers 12 may represent a general-purpose computing device, such as x86 processor-based servers, configured to operate according to techniques described herein. Servers 12 may also include specialized devices for executing VNFs, such as the NFX Network Services Platform by Juniper Networks® that leverages network function virtualization (NFV) to enable customers to deploy multiple secure and high-performance VNFs.

Although primarily described with respect to data center 10, NFVI may be located in data center 10, network nodes of service provider network 7, and at any of customer sites 11. For example, multiple geographically-distributed data centers may host NFVI accessible to controller 24 and usable by the service provider for implementing network services. The NFVI at different locations may use different software architectures and different types of switches for switching among VNFs hosted by the NFVI.

Example VNFs includes virtualized applications such as firewall, carrier grade network address translation (CG-NAT), media optimization (voice/video), WAN optimization, NAT44, NAT64, HTTP header enrichment functions, TCP optimizers, IPSec/VPN services, deep packet inspection (DPI), HTTP filtering, counting, accounting, charging, and load balancing of packet flows, and application-level gateways (ALGs) as well as complex network functions such as Service Gateways, broadband network gateways (BNGs), and Packet Data Network Gateways (PGWs).

Each of VNFs 23 may be implemented using a virtual machine, a container, or other virtualized execution environment that executes the VNF. Server 12A executes two VNFs 23A and server 12X executes two VNFs 23X. However, a server 12 may execute as many VNFs as is practical given hardware resource limitations of the server 12. Each of VNFs 23 may use one or more virtual hardware components to 21 to perform packet I/O or otherwise process a packet. For example, a VNF of VNFs 23A may use one virtual hardware component (e.g., an SR-IOV virtual function) enabled by NIC $13A_2$ to perform packet I/O and receive/send packets on one or more communication links with TOR switch 16A.

As described in further detail below with respect to FIGS. 4A-4D, VNFs 23 are provisioned on servers 12 to use one of the types of switching, provided by the server, for packet input/output (I/O). The type of packet I/O configured for a VNF 23 corresponds to the type of switching used by the server for packets sent by or to be received by the VNF 23. For example, a VNF 23 configured to use SR-IOV uses a virtual function for packet I/O, and the server 12 that executes the VNF 23 uses a NIC-based switch for SR-IOV-type switching for the VNF 23 packets.

In the example provisioning configurations of FIG. 1, VNFs 23A are provisioned on server 12A to use the SR-IOV type of switching. VNF $23B_1$ and VNF $23B_2$ are also provisioned on server 12B to use the SR-IOV type of switching. VNF $23B_3$ however is provisioned on server 12B to use switch 17B for packet I/O, where switch 17B may represent a standard OVS switch, an OVS switch with DPDK enabled, or a Linux virtio bridge.

In general, a virtual machine provides a virtualized/guest operating system for executing applications in an isolated virtual environment. Because a virtual machine is virtualized from physical hardware of the host server, executing applications are isolated from both the hardware of the host and other virtual machines.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

In some examples, each of VNFs may require one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interface cards as "virtual functions" for use by respective virtual machines executing on the server 12. In this way, the virtual machines may share the same PCIe physical hardware resources and the virtual functions are examples of virtual hardware components 21. As another example, one or more servers 12 may implement virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions. These types of switches are described further below with respect to FIGS. 4A-4D.

NICs 13 may each include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between guest Operating Systems/virtual machines configured to use the SR-IOV virtual functions.

The switches of data center 10 make up a multi-layer switch hierarchy. In the example of FIG. 1, chassis switches 18, TOR switches 16, host switch 17A (and any other host switches), and internal device switches of NICs 13 form nodes of respective switch layers of the multi-layer switch hierarchy, with interconnecting links between respective nodes of the switch layers making up edges of the multi-layer switch hierarchy. IP fabric 20 interconnecting chassis switches 18 may represent a root of the multi-layer switch hierarch. Packets output by a virtual hardware component are able to reach other virtual hardware components in the data center 10 by traversing links and nodes that make up the multi-layer switch hierarchy. For example, a packet output by a virtual hardware component 21A associated with NIC $13A_1$ may be switched by an internal device switch of NIC $13A_1$ to another virtual hardware component 21A associated with NIC $13A_1$. As another example, the packet may be switched by the internal device switch of NIC $13A_1$ to host switch 17A, which switches the packet to NIC $13A_2$ having another internal device switch that switches the packet to a virtual hardware component 21A associated with NIC $13A_2$. As another example, the packet may be output by NIC$13A_1$ to TOR switch 16A, which switches the packet to NIC 13X of server 12X, which switches the packet to a virtual hardware component associated with NIC 13X. In general, the more layers of the multi-layer switch hierarchy that are traversed by a packet switched by data center 10 infrastructure between a source VNF and a destination VNF, the greater the latency for the packet between the source VNF and the destination VNF, due to a larger number of inter-switch communication links and a larger number of switches traversed by the packet. In addition, higher-layer switches may have a greater internal switching latency (i.e., the time required by a switch to input, process, and output a packet) vis-à-vis lower-layer switches. For example, chassis switch 18A may have a greater internal switching latency to switch packets among TOR switches than the internal switching latency of NIC 13X to switch packets among virtual hardware components 21A.

A virtual hardware component or switch that is able to access IP fabric 20, the core, or the multi-layer switch hierarchy root from another higher-layer switch, tracing one node per layer, is said to "belong to" or be "under" that higher-layer switch. For example, the internal device switch of NIC $13A_1$ belongs to TOR switch 16A and chassis switch 18A, but it does not belong to TOR switch 16N.

The service provider for service provider network 7 may provision network services for the customer of customer sites 11. In general, a network service is a forwarding graph of network functions interconnected by supporting network infrastructure. The various network functions can be implemented in multiple different networks, such as data center 10, service provider 7, and any of customer networks 11. The network functions that make up the network service contribute to the overall functionality of the higher-level network service. As such, network service processing operations are a combination of its functional blocks, which can include individual network functions, sets of network functions, network function forwarding graphs, and/or the infrastructure network.

A network function receives packets from one endpoint and outputs the processed packets to another endpoint. Network infrastructure delivers packets classified to a network service between the endpoints and the network functions according to the network function forwarding graph.

FIG. 1 illustrates packets flows 19A, 19B, and 19C (collectively, "packet flows 19") between different pairs of networks connected to service provider network 7, in either direction. Each of packet flows 19 represents one or more packet flows. Packet flows 19A are processed and forwarded by service provider network 7 between customer site 11A and public network 15. Packet flows 19B are processed and forwarded by service provider network 7 between customer sites 11A and 11B. Packet flows 19C are processed and forwarded by service provider network 7 between customer site 11B and public network 15. Service provider network 7 may implement a customer virtual private network (VPN), such as a Layer 3 VPN, Ethernet VPN, or Virtual Private LAN Service, to interconnect customer sites 11. Service provider network 7 may provide interconnection services for many different customers and associated customer sites.

The term "packet flow," "traffic flow," or simply "flow" refers to a set of packets originating from a particular source device and sent to a particular destination device. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. The techniques described in this disclosure may apply to packet flows between any two virtualized network functions and are not limited to application to flows 19 depicted in FIG. 1.

Service provider network 7 may provide a site-specific network service for each of customer sites 11A, 11B, with each site-specific network service including one or more VNFs. In addition, service provider network 7 may provide the customer of customer sites 11 with a customer-specific network service that includes, for instance, VNFs that are common across customer sites 11 and additionally or alternatively includes network functions applied to packet flows entering/executing the customer virtual private network from/to public network 15.

Controller 24 manages and orchestrates resources to configure VNFs 23 (and/or other VNFs for service provider network 7) for network services and provision inter-VNF instance connectivity in the network infrastructure. Controller 24 may output configuration data to, e.g., servers 12 to configure the servers to execute VNFs. Controller 24 may include one or more computing devices that execute in a centralized or distributed manner to perform management and orchestration (MANO). Orchestration may include onboarding and coordinating VNFs that in combination instantiate a network service. Additional details regarding NFV MANO is found in "Network Functions Virtualization (NFV); Management and Orchestration," ETSI GS NFV-MAN 001 v1.1.1, European Telecommunications Standards Institute (ETSI), December, 2014, (hereinafter, "NFV MANO") which is incorporated by reference in its entirety.

Controller 24 may obtain network service descriptors for network services and provisions the network services in network system 8. A network service descriptor describes the forwarding graph for a network service, including by indicating the constituent network functions (firewall, BNG, etc.) as well as the topology between the network functions of the network service. A network service descriptor may specify connection points, which may acts as endpoints of the network service Constituent network functions may specify VNFs, PNFs, or some combination thereof. A network service descriptor may include one or more virtualized network function descriptors, which may each specify, e.g., an identifier, a virtual machine image or other software image for execution to perform the VNF, a vendor, and a version. A virtualized network function descriptor may also include connectivity and interface requirements for the corresponding VNF for establishing connectivity with the VNF.

A network service descriptor may indicate the topology for the network service by referencing VNFs and/or PNFs, links that connect the network functions. For example, a network service descriptor may specify a chain of network functions using a list data structure or other data structure for specifying an ordering of the constituent network functions in which user plane traffic is to be processed by the network service.

The network service descriptor may specify the chain of network functions using an ordered list of connection points forming a chain of network functions (VNFs or PNFs). The connection points may refer to Virtual Link Descriptors (vld), which are deployment templates which describe the resource requirements that are needed for a link between VNFs, PNFs, and endpoints of the Network Service, and which can be met by various link options that are available in the NFVI.

An example network service descriptor is nsd, an example virtualized network function descriptor is vnfd, and an example data structure for indicating a network function topology is vnffgd (VNF Forwarding Graph), which are described in NFV MANO.

In the example of FIG. 1, controller 24 provisions network services 26A-26C (collectively, "network services 26") for the customer associated with customer sites 11. Each of network services 26 may be one of the customer site-specific network services or a customer-specific network service for the customer associated with customer sites 11. However, network services 26 are not limited to those associated with the customer associated with customer sites 11 and may be any network service having one or more constituent network functions.

Controller 24 may obtain network service descriptors for network services 26 from a data center operator 10, the service provider, a customer portal for requesting network services, a network management system. The respective network service descriptors for network services 26A-26C each includes one or more VNFs in an ordering that defines a chain of VNFs to be applied to packets mapped to the network service, where pairs (if any) of VNFs adjacent in the ordering are "intra-network service adjacent VNFs." Packets of any of packet flows 19 may in some cases have multiple network services from network services 26A-26C applied between the source device and destination for such packet flows. For example, the customer-site specific network service for customer site 11A and the customer-site specific network service for customer site 11B may both be applied to packets of packet flow 19B. As another example, a customer-specific network service and the customer-site specific network service for customer site 11B may both be applied to packets of packet flow 19C. Two or more network services having this property are "network service adjacent." Moreover, terminal VNFs of network service adjacent network services are "inter-network service adjacent VNFs." For example, a last VNF of network service 26A in the ordering may be an inter-network service adjacent VNF with the first VNF of network service 26B. Both intra-network service adjacent VNFs and inter-network service adjacent VNFs are adjacent VNFs.

Controller 24 obtains network description 25 that describes the multi-layer switch hierarchy of data center 10. Network description 25 may specify logical locations of virtual hardware components 21 usable by VNFs 23, such logical locations indicating, e.g., a number of virtual hardware components 21 for which any of (1) an internal device switch of a NIC 13, (2) a host switch 17, (3) a TOR switch 16, or (4) a chassis switch 18 is on a forwarding path from IP fabric 20 to the number of virtual hardware components. For example, an internal device switch of NIC 13X is on a forwarding path from IP fabric 20 to each of virtual hardware components 21X. TOR switch 16A is also on the forwarding path from IP fabric 20 to each of virtual hardware components 21A-21X. In general, two virtual hardware components 21 having the same switch on a forwarding path from IP fabric 20 to the two virtual hardware components 21 are said to be "switch adjacent" with respect to that same switch at the layer of multi-layer switch architecture occupied by the switch (e.g., TOR, host, internal device switch, can forward packets to one another via the same switch without using a switch in a higher layer of the multi-layer switch hierarchy, and are therefore more "logically near" to one another than two virtual hardware components that do not have these properties. Additional details of an example network description 25 are described below with respect to FIG. 3A. Network description 25 may be configured by a data center 10 operator or network management system, or controller 24 may obtain network description 25 by operation of servers 12 to measure latency of inter-NIC 13 switching among the servers 12 and send indications of the latency to controller 24 for analysis and storage as network description 25.

Network description 25 also describes types of switching available on each of the host devices usable by controller 24 for provisioning VNFs. Network description 25, for example, may include a data structure that lists each of servers 12 with a corresponding list of one or more types of switches for the server, e.g., Linux bridging, OVS with DPDK, standard OVS, and NIC-based switching for SR-IOV virtual and physical functions. For each of servers 12, the network description 25 may also indicate a number of available resources for different types of switches, such as the number of virtual functions available for an SR-IOV-capable server 12.

Controller 24 may orchestrate network services 26 by, in part, placing, for execution, adjacent constituent VNFs for network services 26 to network function virtualization infrastructure that is logically near in the multi-layer switch hierarchy. More specifically in some cases, based at least on network description 25 and the respective network service descriptors (NSDs) 26A', 26B', 26C' for one or more network services 26, controller 24 may orchestrate the VNFs for each network service 26 in part by identifying available virtual hardware components that are logically near and placing adjacent VNFs of the network services 26 to the identified virtual hardware components.

For adjacent VNFs 23A1 and 23A2 of network service 26A, for example, controller 24 may identify available virtual hardware components 21A of server 12A that are switch adjacent with respect to host switch 17A. For adjacent VNFs 23A1 and 23X1 of network service 26A, not enough available virtual hardware components are available. Controller 24 thus attempts to identify available virtual hardware components that are switch adjacent at the next higher layer of the multi-layer switch hierarchy, the TOR/leaf layer. Controller 24 identifies available virtual hardware components 21A of server 12A and 21X of server 12X that are switch adjacent with respect to TOR switch 16A.

In response to identifying available virtual hardware components that are switch adjacent, controller 24 may orchestrate VNFs 23A1, 23A2, and 23X1 to provision and configure servers 12A, 12X with the VNFs. Controller 24 may also provision the data center 10 network and servers 12 with network forwarding information to implement the network function forwarding graph for network server 26A.

In some cases, controller 24 may determine network services 26A, 26B are service adjacent that therefore attempt to orchestrate the terminal egress VNF 23X1 of network service 26A and the terminal ingress VNF 23X2 of network service 26B. Controller 24 may, in response, attempt to orchestrate network services 26A, 26B to place the VNFs of the network services 26A, 26B logically near to one another for execution. As illustrated in FIG. 1, controller 24 may identify available virtual hardware components 21A, 21X that are switch adjacent with respect to TOR switch 16A. Controller 24 may also determine network service 26C is service adjacent with respect to either of network services 26A, 26B and therefore attempt to place the service adjacent services logically near to one another in the NFVI.

As part of orchestrating adjacent VNFs, controller 24 may attempt to identify available virtual hardware components that are switch adjacent at the lowest possible layer in the multi-layer switch hierarchy. In other words, controller 24 attempts to determine the lowest-layer switch having virtual hardware components that belong to the switch and are available to implement the adjacent VNFs. By placing adjacent VNFs in this manner, controller 24 may reduce a number of layers of the multi-layer switch hierarchy traversed by network packets classified to the network service. At least in some cases, the techniques may reduce intra-network service latency between VNFs of the same network service and/or reduce inter-network service latency between terminal VNFs of different network services, thereby improving the operation of the NFV infrastructure.

In accordance with techniques described herein, controller 24 selects and provisions input/output methods for VNFs 23 for network services that determine the one or more types of switch to be applied by a server 12 for inter-VNF switching operations for each of the VNFs. Controller 24 may also or alternatively select a server 12 to host the VNFs 23 for the network service to realize the selected input/output methods for the VNFs 23. As described above, servers 12 may at least in some cases have heterogenous types of switches for inter-VNF switching. As part of the provisioning, controller 24 may access a data structure describing the types of switches and packet input/output resources available for each server 12.

In the example of FIG. 1, based on the requirements for NSD 26C and the switching and packet I/O resources of servers 12, controller 24 selects a preferred input/output method for each VNF of the NSD 26C. Based on data describing the input/output methods and resources available at each server 12 in network description 25, controller 24 then attempts to select a server 12 that can support all of the VNFs with the determined input/output methods to host all VNFs of the network service. Controller 24 determines that VNF $23B_1$ and VNF $23B_2$ are to use SR-IOV for packet I/O and VNF $23B_3$ is to use OVS with DPDK enabled. Controller 24 selects server 12B as having available virtual hardware components 21B to support VNF $23B_1$ and VNF $23B_2$ and as having an OVS with DPDK enabled switch 17B.

Controller 24 provisions the selected server 12B with the VNFs of NSD 26C with the packet I/O methods determined for the VNFs. That is, controller 24 provisions VNF $23B_1$ and VNF $23B_2$ to use SR-IOV and provisions VNF $23B_2$ and use OVS with DPDK enabled switch 17B for packet I/O. Server 12B applies the network service 26C, as provisioned by controller 24, to data traffic mapped to the network service and delivered to the selected server 12B. The techniques may increase throughput of the network service 26C by provisioning VNFs with input/output methods selected to account for switching performance between VNFs in a network service for different switching types among servers 12, while still meeting constraints for VNF portability, migration, and security. As a result, the NFVI may provide better data path performance to data traffic processed by network services.

Figure 2:
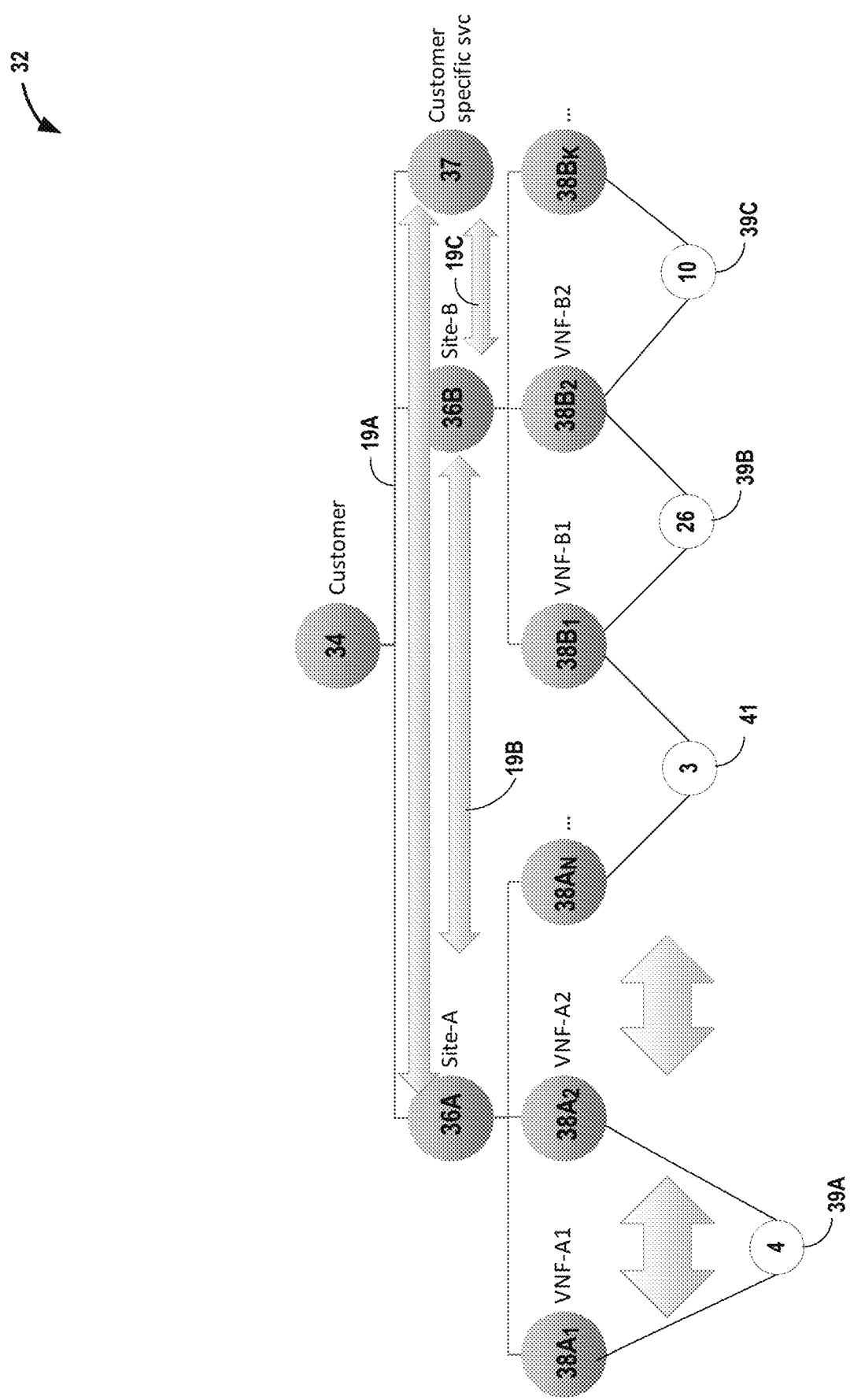
FIG. 2 is a conceptual diagram illustrating network services for a customer, having network service descriptors extended according to techniques described herein.

FIG. 2 is a conceptual diagram illustrating network services for a customer, having network service descriptors extended according to techniques described herein. Diagram 32 illustrates relationships among VNFs of a single customer. Virtual Customer Premises Equipment (vCPE) customer 34 of a service provider can have one or more customer sites each having a site-specific service 36 including one or more VNFs 38. For example, "Site-A" has a site-specific service 36A that includes VNFs $38A_1$-$38A_N$ and "Site-B" has a site-specific service 36B that includes VNFs $38B_1$-$38B_K$. Site-A and Site-B may be example instances of customer sites 11 of FIG. 1. Site-specific services 36 may be example instances of networks services 26 of FIG. 1. A customer may also have a customer-specific service 37 that includes VNFs common across all the sites (Site-A, Site-B, etc.), as well as (or alternatively) those VNFs that may need to be performed before the customer traffic exits or enters the customer virtual private network. Additional details are found in U.S. patent application Ser. No. 15/394,215, "NETWORK SERVICE APPLICATION AND CUSTOMER-AWARE VIRTUALIZED NETWORK FUNCTION PLACEMENT," filed Dec. 29, 2016, which is incorporated herein by reference in its entirety.

In general, packet flows egress the right interface of $VNF_i$ of a network service 36, 37 and ingress the left interface of $VNF_{i+1}$, or in the reverse direction for a network service, egress the right interface of $VNF_{i+1}$ and ingress the left interface of $VNF_i$.

Diagram 32 depicts intra-network service adjacencies between VNFs 38 of the same network service 36. For example, VNF $38A_1$ ("VNF-A1") is intra-network service adjacent with VNF $38A_2$ ("VNF-A2"). Diagram 32 also depicts inter-network service adjacencies between network services 36. For example, VNF $38A_N$ ("VNF-AN") may be intra-network service adjacent with VNF $38B_1$ ("VNF-$B_1$") for packet flow 19B.

In accordance with techniques described herein, for one or more network services 36, 37, the virtual link descriptors of the network service descriptors, such as yids as described in ETSI MANO, may be extended to store data describing relative ranking or weight of the described link between VNFs. Controller 24 may place pairs of VNFs having linking VLDs with higher ranking or weight to use virtual hardware components that are logically near to one another for execution of the VNFs. Controller 24 may receive the extended network service descriptor with virtual link descriptors extended to include, e.g., values for weights 39, from a service provider operator or network management system.

Diagram 32 illustrates weights 39A-39C that indicate a strength of the adjacency between the corresponding VNF pair. For example, weight 39A indicates a weight of 4 between VNF $38A_1$ and VNF $38A_2$, which is less than the weight of 26 indicated by weight 39B between VNF $38B_1$ and VNF $38B_2$. Weights 39 are intra-network service weights. Diagram 32 also illustrates an inter-network service weight 41, that value of which indicates a strength of the adjacency between network services 36A, 36B.

Controller 24 may receive, in association with a network service descriptor for a new network service for a customer, inter-network service weights for other respective network services for the customer. In this way, controller 24 may prioritize placement of VNFs for the new network service, particularly terminal VNFs for the new network service, to virtual hardware components that are logically near to more highly weighted network services of the customer.

Controller 24 may in some cases determine intra-network service weights 39 for a network service by analyzing past usage of virtual links linking VNFs of the network service. A service provider portal may present the customer with a catalog of available Network Service Types available, which may be selected by the customer for instantiation. The underlying representation of each Network Service Type in the catalog is a network service descriptor, described above. The network service descriptor may be extended to store the data of previous instances of this network service descriptor to describe, in virtual link descriptors, the amount of actual traffic that traversed each described virtual link. For a new network service instantiation, the historical usage data may used to rank or weight virtual link descriptors such that more heavily utilization virtual links are indicated to have a stronger adjacency, and controller 24 may accordingly place VNF pairs with higher ranked/weighted virtual link descriptors logically near to one another in the multi-layer switch hierarchy of the data center network.

Controller 24 may store the historical usage data per customer or per customer-site to specifically track the links between VNFs for a particular customer or customer site. On a new instantiation request for a given network service descriptor for a customer site, the controller 24 reads historical usage data of the network service descriptor for a customer site. If this is not available, controller 24 reads historical usage data of the network service descriptor for the customer. If this is not available, controller 24 may read historical usage data of the network service descriptor for all customers of the service provider. In some examples, the historical usage data may be stored or at least analyzed by controller 24 using a weighted moving average to give preference recent trends in usage.

Figure 3A:
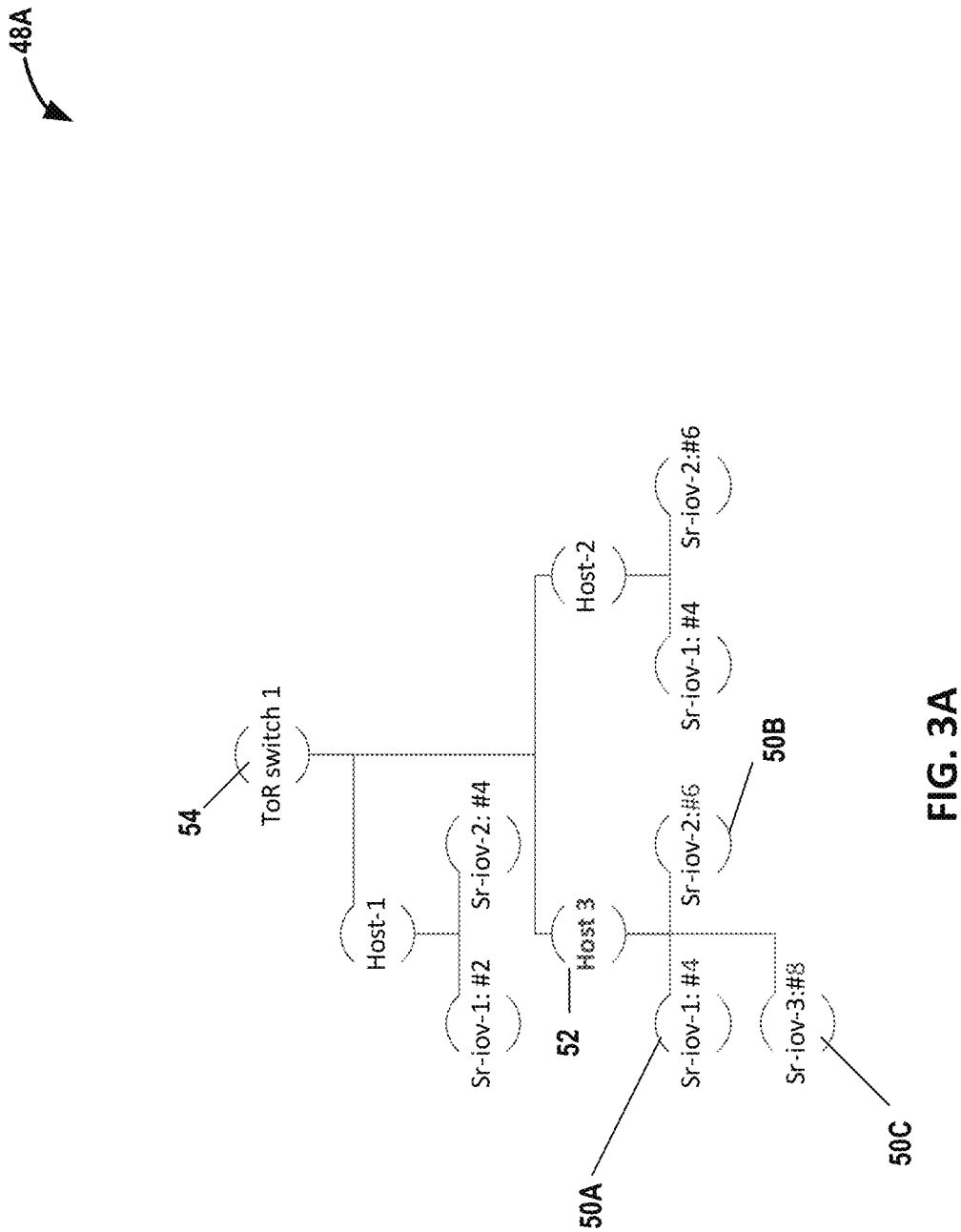
FIG. 3A is a graph illustrating available virtual hardware components within a multi-layer switching hierarchy of, e.g., a data center, according to techniques described herein.

FIG. 3A is a graph illustrating available virtual hardware components within a multi-layer switching hierarchy of, e.g., a data center, according to techniques described herein. Graph 48A depicts three switching layers, but other examples may include more or fewer layers, as well as more of fewer switch instances for each layer. Nodes 50A-50C indicate available virtual hardware components for a hardware components, in this case, a number of SR-IOV virtual functions for an SR-IOV-capable NIC. Nodes 50A, 50B, for instance, occupy a leaf hardware component layer of graph 48A and indicate 4 and 6 virtual functions available for SR-IOV NIC 1 ("Sr-iov-1") and SR-IOV NIC 2 ("Sr-iov-2"), respectively. The number of virtual functions for an SR-IOV device are indicated by SR-IOV-devid: {#virtual functions}. The switches for nodes 50 may be internal device switches of the SR-IOV device. Node 52 represents a host switch (e.g., host switch 17A of FIG. 1) for switching packets among multiple hardware components of the same computing device. A node at the host switch layer may aggregate a number of available virtual hardware components for sub-layers of the host switch layer to indicate the number. Node 52 may thus indicate 18 virtual functions in the example graph 48A. Node 54 represents a TOR or leaf switch (e.g., TOR switch 16A of FIG. 1). A node at the TOR switch layer may aggregate a number of available virtual hardware components for sub-layers of the TOR switch layer to indicate the number. Node 54 has 3 hosts occupying the host sub-layer and hardware components distributed among the hosts, with each hardware component having zero or more available virtual functions. Node 54 may indicate 34 virtual functions in the example graph 48A.

In general, communications costs (e.g., latency) in a data center network increase as packets are required to traverse higher layers of a multi-layer switching hierarchy. The lowest communication cost is between interfaces/virtual hardware components on the same hardware component (e.g., SR-IOV device), with costs increasing as packets traverse the same host, same TOR/leaf switch, same chassis/spine switch, and same data center fabric.

Data for graph 48A may be stored as a set of one or more data structures. For example, such data may be stored as one or more lists, with each list including data describing one layer of the multi-layer switch hierarchy. The data structures may be manually configured or generated based using autodiscovery techniques described below. With manual configuration, a network administer may provide a topology to controller 24 that includes the number of levels in the multi-layer switch hierarchy, each level including a list of switches and, for each switch in the list of switches, a list of child switches. The lowest level may represent the network topology within the hosts. The network topology may be provided as: number of levels of switches, for each level L_i the list of children switches L_i [1 . . . n], and recursively for each children L_i [j], where 1<=j<=n, the list of children of L_i[j] in the form L_i+1 [1 . . . k].

For example, a list ("List A") of available virtual functions per-SR-IOV device may be stored, sorted in descending order by SR-IOV device based on the number of available VFs for the SR-IOV device. For example:
A) Per-SR-IOV device: number of free VFs
[host_id #1.sr-iov-devid_1]:{#VFs}
[host_id #1.sr-iov-devid_2]:{#VFs}
:
:
[host_id #n.sr-iov-devid_1]:{#VFs}

A list ("List B") of available virtual functions per-SR-IOV device per host may be stored, sorted in descending order by host based on the number of available VFs for the host. The list may also indicate any available switching types within each identified host. For example:
[host_id]=[{host_id.sr-iov-devid}:{#VFs},
{host_id.sr-iov-devid}:{#VFs},
. . .
capabilities: ovs-dpdk, ovs-switch, virtio
]

The "capabilities" item for the host device "host_id" indicates that the host computing device can support OVS with DPDK enabled, standard OVS, and virtio virtual network switch types. The presence of SR-IOV devices in the list item for the host device also indicates that the host device can support SR-IOV, although this may be explicit in the capabilities item in some examples. Other host devices may support different combinations of switching types. When selecting a host device from the lists of host devices, controller 24 may select the host device that matches the requirements for number of available virtual functions and capability to support OVS with DPDK enabled, standard OVS, and virtio, for example. Because controller 24 may select a host device to provision a network service that does not use SR-IOV as the switching type for every VNF of the network service, the techniques may reduce the number of VFs required for the host device to support the network service and thereby increase the probability that a suitable host at a given site is available to support the network service.

A list ("List C") of available virtual functions per-SR-IOV device per host per TOR switch may be stored, sorted in descending order by TOR switch based on the number of available VFs under the TOR switch. For example:

```
ToR-switch1: [
    [host_id_1]=[{host_id.sr-iov-devid}:{#VFs},
        {host id.sr-iov-devid}:{#WFs},
        . . .
    ],
    :
    :
    [host_id_2]=[{host_id.sr-iov-devid}:{#VFs},
        {host_id.sr-iov-devid}:{#VFs},
        . . .
    ]
]
:
:
ToR-switchN:[
    host_id_n1: . . .
    :
]
```

A list ("List D") of available virtual functions per-SR-IOV device per host per TOR switch per chassis/spine switch may be stored, sorted in descending order by chassis/spine switch based on the number of available VFs under the chassis/spine switch. Although described as lists, other suitable data structures may be used to indicate available virtual hardware components.

Figure 3B:
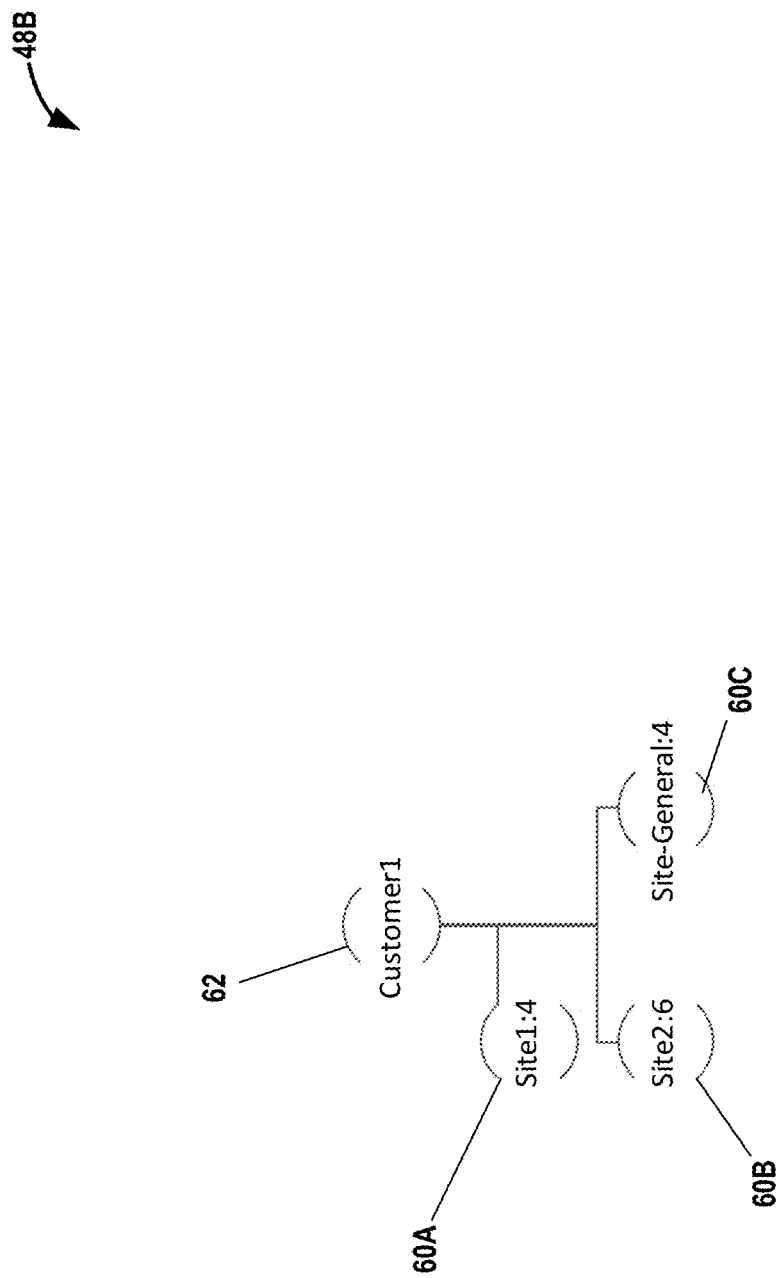
FIG. 3B is a graph illustrating customer network service requirements for a customer of a service provider, according to techniques described herein.

FIG. 3B is a graph illustrating customer network service requirements for a customer of a service provider, according to techniques described herein. The customer network service requirements may correspond to the network services depicted in FIG. 2. Graph 48B illustrates that customer 62 requires three network services indicated by network service nodes 60A-60C. Network service node 60A may be for a Site-1, network service node 60B may be for a Site-2, and network service node 60C may be a "Site-general" or "customer-specific" network service, as described above. Each network service node also indicates a number of virtual hardware components needed to implement constituent VNFs of the corresponding network service. As indicated in graph 48B, the network service for node 60A requires 4 virtual functions to implement its constituent VNFs, the network service for node 60B requires 6 virtual functions to implement its constituent VNFs, the network service for node 60C requires 4 virtual functions to implement its constituent VNFs. While depicted as a graph, the data for graph 48B may be stored using any suitable data structure.

Figure 3C:
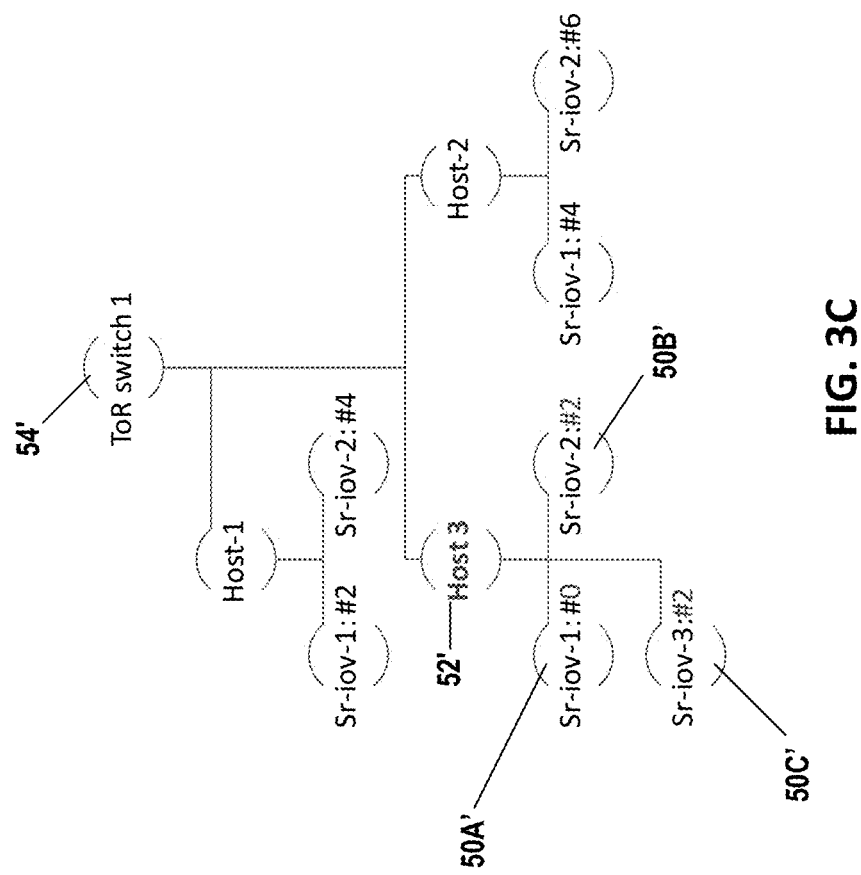
FIG. 3C is a graph illustrating available virtual hardware components within a multi-layer switching hierarchy of, e.g., a data center, according to techniques described herein.

FIG. 3C is a graph illustrating available virtual hardware components within a multi-layer switching hierarchy of, e.g., a data center, according to techniques described herein. Graph 48C is an update of graph 48A to indicate placement of VNFs for network services 60, illustrated in graph 48B, to "host 3." Controller 24 orchestrates networks services, in part, by placing VNFs for a network service to host computing devices having available virtual hardware components for implementing the VNFs. In some examples, controller 24 may perform a worst fit allocation ascending a multi-layer hierarchy to distribute network service VNF load across multiple hosts and to allow service expansion space for a customer. An example algorithm for host-level virtual hardware component selection and VNF assignment is described below with respect to FIG. 8.

In graph 48C, host node 52' for a host switch has child nodes 50A'-50C' for corresponding hardware components, the child nodes each indicating a number of virtual hardware components remaining after assignment of VNFs for network services represented by network service nodes 60 of graph 48B. To take one example, node 50A' for SR-IOV NIC 1 ("Sr-iov-1") has 0 virtual functions remaining after the 4 VNFs for the network service for network service node 60A is assigned to the node 50A' for SR-IOV NIC 1.

FIGS. 4A-4D are computing devices that each implements one or more virtualized network functions, assigned by a controller or other orchestrator, and provide at least one type of switching among virtualized network functions, according to techniques described herein. Each of computing devices 200, 250, 270, and 290 may represent a real or virtual server and may represent an example instance of any of servers 12 of FIG. 1. The computing devices may have similar hardware and/or software elements, such elements being described below primarily with respect to computing device 200 that implements SR-IOV. Although each of the computing device is described as supporting only a single type of switching for packet input/output, a computing device that hosts VNFs may support multiple different types of switching. For example, a single computing device may support SR-IOV as described below with respect to computing device 200, OVS with DPDK enabled as described below with respect to computing device 270, and virtio as described below with respect to computing device 290.

Computing device 200 includes in this example, a system bus 242 coupling hardware components of a computing device 200 hardware environment. System bus 242 couples memory 244, SR-IOV-capable network interface card (NIC) 240, storage disk 246, and microprocessor 210. System bus 242 may be a PCIe bus. NIC 240 may communicate with memory 244 and/or microprocessor using a separate peripheral bus, which may be a PCIe bus. Network interface card 240 includes one or more interfaces configured to exchange packets using links of an underlying physical network. Microprocessor 210 may include one or more processors each including an independent execution unit to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 244, NIC 240, storage disk 246, and microprocessor 210 provide an operating environment for a software stack that executes a hypervisor 214 and one or more virtual machines 216A-110M (collectively, "virtual machines 216"). While illustrated and described with respect to virtual machines, VNF instances 220A-220M may be executed by other operating environments, such as containers (e.g., a DOCKER container). An operating system kernel (not shown in FIG. 4) may execute in kernel space and may include, for example, a Linux, Berkeley Software Distribution (BSD), another Unix-variant kernel, or a Windows server operating system kernel, available from Microsoft Corp.

Computing device 200 executes a hypervisor 214 to manage virtual machines 216. Example hypervisors include Kernel-based Virtual Machine (KVM) for the Linux kernel, Xen, ESXi available from VMware, Windows Hyper-V available from Microsoft, and other open-source and proprietary hypervisors. Hypervisor 214 may represent a virtual machine manager (VMM). Hypervisor 214 may represent or include one or more Quick Emulator (QEMU) hypervisor processes that perform hardware virtualization to emulate CPUs, NICs, and/or other hardware elements to virtual machines 216. A QEMU in some cases is a hosted VMM.

Virtual machines 216 host corresponding VNF instances 220A-220M (collectively, "VNF instances 220"). In some examples, a virtual machine 216 may host one or more VNF instances 220. Each of VNF instances 220 is configured to apply a network function to packets. VNF instances 220 may represent example instances of VNFs 23 of FIG. 1.

Hypervisor 214 includes a physical driver 219 to use the physical function 239 provided by a network interface card 240. Physical function 239 may provide full-featured PCIe functionality and represent the physical hardware port of NIC 240. Network interface card 240 also implements SR-IOV to enable sharing the physical network function (I/O) among virtual machines 216. The shared virtual devices, virtual functions 241A-241Z, provide dedicated resources such that each of virtual machines 216 may access dedicated resources of NIC 240, which appears to each of virtual machines 216 as a dedicated NIC. Virtual functions 241 may represent lightweight PCIe functions that share physical resources with the physical function and with other virtual functions 241. NIC 240 may have thousands of available virtual functions according to the SR-IOV standard, but for I/O-intensive applications the number of configured virtual functions is typically much smaller.

Each of virtual machines 216 includes a virtual function driver 217 presented directly into the virtual machine guest operating system, effectively bypassing hypervisor 214 to offer direct communication between NIC 240 and the virtual machine. This may reduce hypervisor 214 overhead involved with software-based, vSwitch implementations. Accordingly, however, to use virtual functions 241 the VNF instance 220 and virtual machine 216 computing must include a suitable virtual function driver 217. Not all VNFs are suited for using SR-IOV switching. A switch of NIC 240 steers traffic among virtual machines 216 based on MAC addresses and/or 802.1q VLAN identifiers, which is not visible to the NFVI Compute layer. For VNF instance 220A and VNF instance 220N to communicate for inter-VNF (intra-host) communication using SR-IOV, NIC 240 must switch the packets being exchanged from the source VM 216 to the destination VM 216. As a result, intra-host communication by VNFs executed by a single host device may be limited by NIC 240 internal switching bandwidth and the PCIe bandwidth. However, SR-My is well-suited for VNF that require high-performance and provide self-contained application.

Using SR-IOV and an input/output method for VNF instances 220 may prevent use of firewall features and live migration of the VNF instances 220 to other hosts. Firewall and other packet processing features may be applied by a software switch, e.g., OVS, in other switching types. The tight-coupling of VF drivers 217 and virtual functions 241 may prevent live migration.

Computing device 200 further includes a host cost agent 223 to determine communication costs associated with inter-host communications and report communication costs to controller 24. Host cost agent 223 may be executed directly by the hypervisor, be a dedicated process executed by the host operating system, or may be executed by one of virtual machines 216. Host cost agent 223 may be an agent of the controller 24.

Host cost agent 223 may determine communication costs to communicate with one or more other hosts (e.g., other servers 12) within a data center. Host cost agent 223 may receive a list of other hosts within the network from controller 24. Host cost agent 223 may communicate with other hosts using Ping, traceroute (to determine a number of TTL decrements representing inter-switch forwarding hops), or by using other techniques for determining an inter-host latency or other indication of a communication cost between computing device 200 and another host, such as International Telecommunication Union (ITU) Y.1731 or other Operations, Administration, and Management (OAM) techniques, or using techniques described in "Benchmarking Methodology for Network Interconnect Devices," Request for Comments 2544, March, 1999. Host cost agent 223 may report communication costs to other hosts of the data center network to controller 24.

In some examples, data center switches use network discovery techniques to identify other hosts attached to the data center physical network. switches may use Link Layer Discovery Protocol (LLDP) to discovery directly connected switches and report the neighbor information to controller 24, which collects the neighbor information from all switches and creates the network topology.

In some examples, host cost agent 223 reports a configuration of computing device 200 to controller 24. For example, host cost agent 223 may send internal topology data to controller 24 indicating a number of hardware components, or a number of available virtual hardware components in an initial configuration (no assigned VNFs). Host cost agent 223 may discover the internal topology for the computing device 200 by identifying host OS, hypervisor, or virtual machine manager interfaces for virtual hardware components. Controller 24 that receives this internal topology data from multiple hosts may use the data to generate data structures described herein for use in host selection and VNF placement.

Figure 4A:
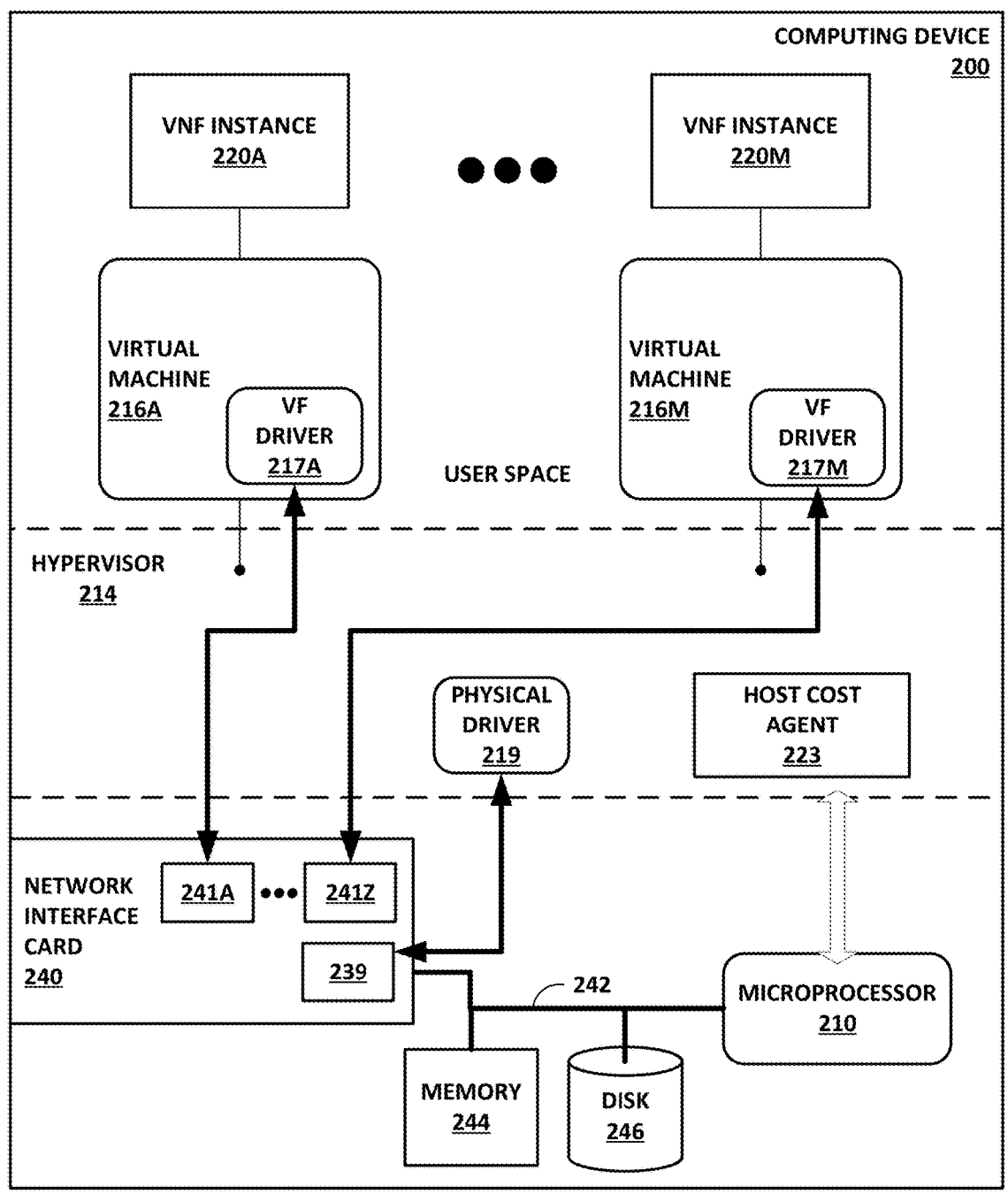
FIGS. 4A-4D are computing devices that each implements one or more virtualized network functions, assigned by a controller or other orchestrator, and provide at least one type of switching among virtualized network functions, according to techniques described herein.
Figure 4B:
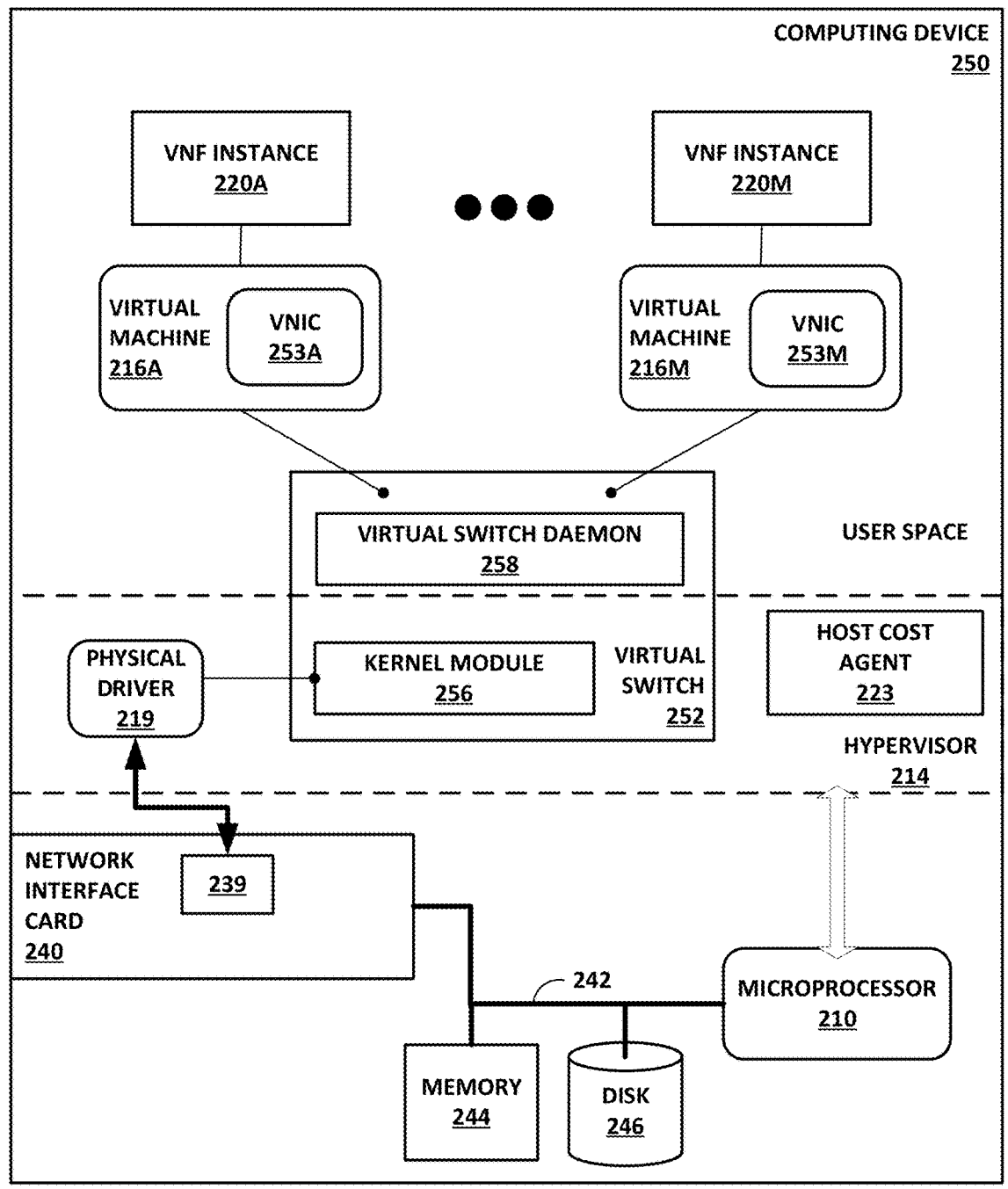

FIG. 4B depicts a computing device 250 that has similar hardware and/or software elements to computing device 200 but is configured to use a software virtual switch 252 switching packets for virtualized network function packet input/output. Each of virtual machines 216 includes a virtual NIC 253 for communicating with a virtual interface provided by virtual switch 252.

Virtual switch 252 is a software-based switch. Virtual switch 252 may represent an Open vSwitch as implemented in Kernel Virtual Machine (KVM) or Xen. Virtual switch daemon 258 is a user space process that processes received packets input or output by virtual machines 216 to implement switching logic using a lookup table keyed to MAC addresses or VLAN identifiers, e.g., of the virtual machines 216. After processing the first packet of a packet flow, kernel module 256 handles fast-path processing of subsequent packets. As a result, the achievable packet throughput may be limited by the forwarding bandwidth of the network stack. A controller, such as controller 24, configures virtual switch daemon 258 using, e.g., OpenFlow or Javascript Object Notation (JSON) Remote Procedure Calls (RPC).

Figure 4C:
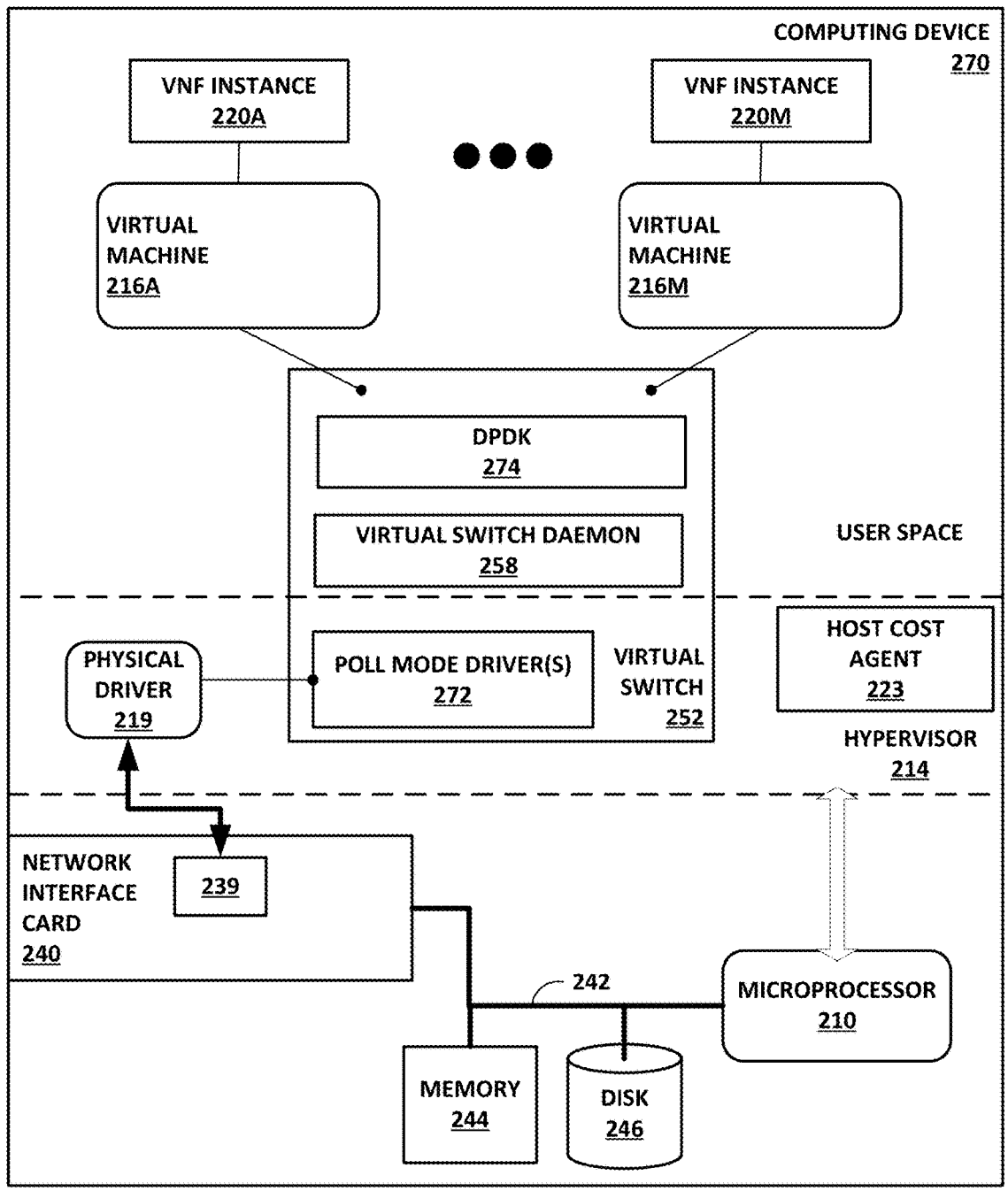

FIG. 4C depicts a computing device 270 that is similar to computing device 250 but in which the virtual switch 252 has Data Plane Development Kit (DPDK) enabled. DPDK is a set of user space libraries and drivers for fast packet processing and is designed to run primarily in user space such that applications can perform fast-packet processing directly from/to the network interface card. This feature of DPDK tends to reduce latency and allow more packets to be processed.

A DPDK enabled application may eschew communications performed by the virtual switch 252 using the kernel network stack. Instead, one or more NICs 240 are bound to poll mode driver(s) 272 to enable direct transferal of packets between user space applications and the physical network interface card 240. With DPDK, computing device 270 replaces the standard OVS kernel data path (represented by kernel module 256 of computing device 250) with a DPDK-based data path, thus creating a primarily user space version of virtual switch 252, which is using DPDK 274 (using poll mode driver(s) 272) for packet forwarding between the NIC and the virtual machines 216.

Figure 4D:
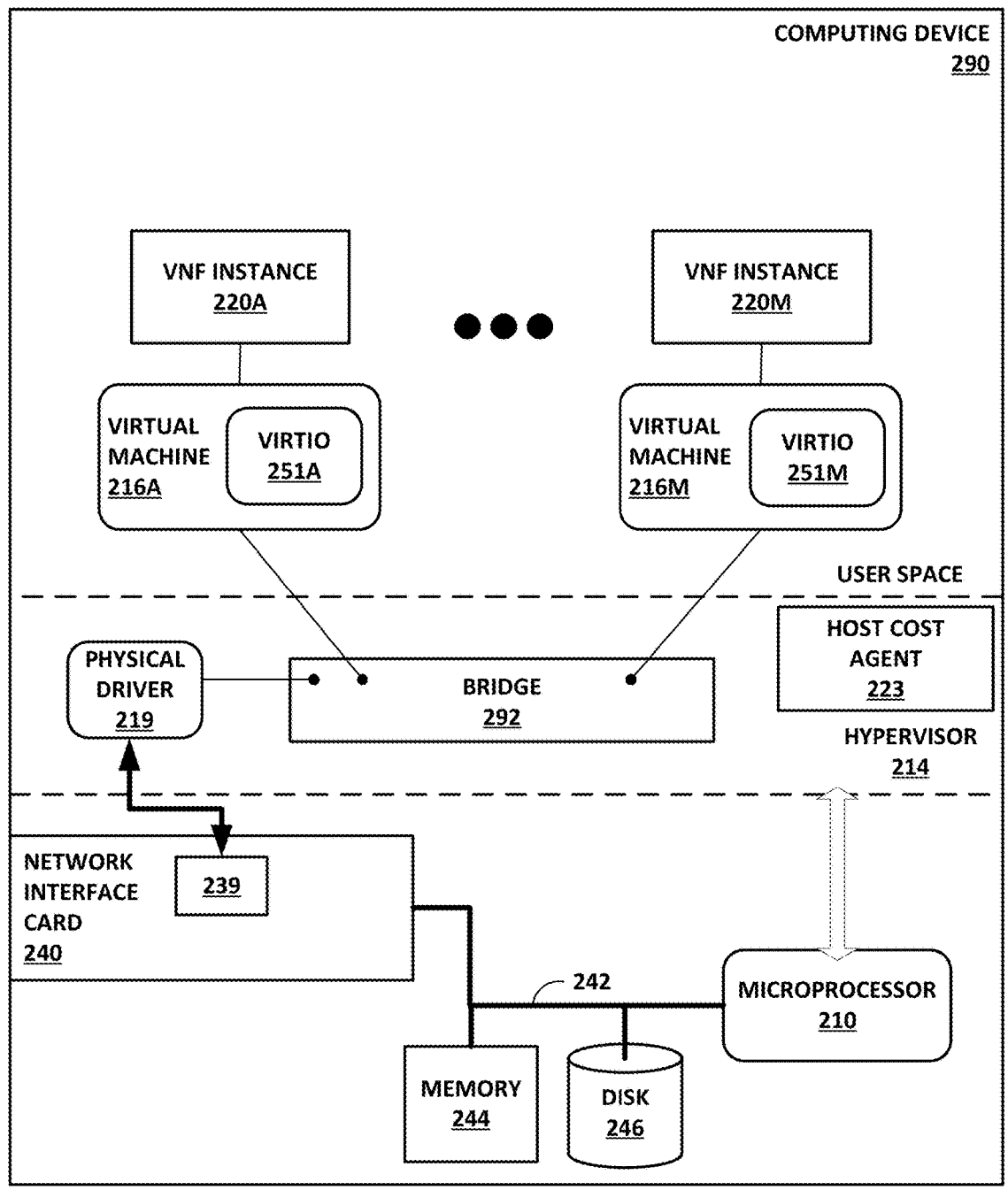

FIG. 4D depicts a computing device 290 that uses a kernel-based software bridge 292 for packet switching for VM input/output. Bridge 292 may represent a native Linux bridge. Virtio (also referred to as "virtIO" or "Virtio") is a software abstraction layer over devices in a paravirtualized hypervisor. Virtio front-end drivers 251A-251M of virtual machines 216 communicate, via a virtual switch daemon 258, with a back-end driver provided by a kernel module that emulates NIC 240 to perform packet I/O for virtual machines 216 and VNF instances 220. Virtio front-end drivers 251 may represent kernel modules in virtual machines 216, accept I/O requests from VNF instances 220, and transfer I/O requests to the back-end driver. The back-end driver accepts the I/O requests from virtio front-end drivers 251 and performs I/O operations using NIC 240. Virtual machines 216 may represent Linux guest operating systems in computing device 200, 250, 270, 290.

FIG. 5 is a table of inter-host communication costs, according to techniques described herein. Each entry of table 300 indicates a communication cost between a pair of hosts of a data center network (e.g., a pair of servers 12). Controller 24 may generate table 300 using data received from instances of host cost agent 223 for respective hosts. The value of the "Cost" column for an may represent, in this example, a one-way or round-trip time latency between the hosts of the entry. Entries of table 300 indicate hosts using a string made up of identifiers for multiple switches of the data center network, which is explained further below with respect to FIG. 6. Each node may be identified using an IP address in some examples.

Figure 6:
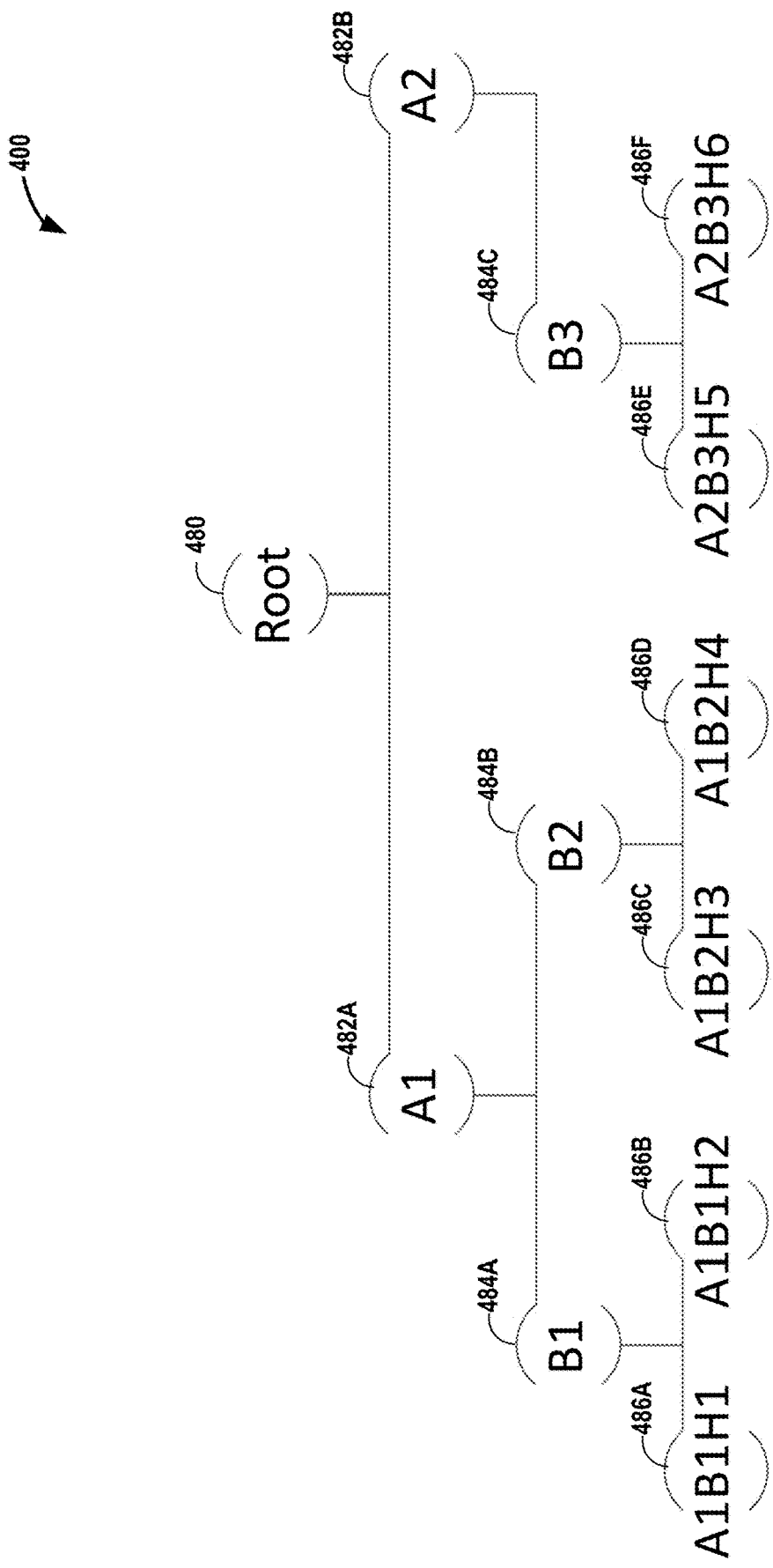
FIG. 6 is a graph illustrating a multi-layer switch hierarchy, according to techniques described herein.

FIG. 6 is a graph illustrating a multi-layer switch hierarchy, according to techniques described herein. Controller 24 may dynamically generate one or more data structures that include data that may be visualized as graph 400 using communication cost data. Graph 400 includes a root 480 and three layers: 482, 484, and 486.

Controller 24 may apply an algorithm to communication costs inputs to generate the first layer 486 as a set of groups where each group contains all nodes that connect to one another with similar costs within boundary range, which may be determined using a percentage variation or other type of variation (e.g., standard deviation) from the group. Controller 24 generates groups of layer 484 by grouping groups of layer 486, and generates groups of layer 482 by grouping groups of layer 484. An example algorithm, written in Python, for generating lists of hosts for each of layers 482, 484, and 486 is as follows:

```
#!/usr/bin/env python
import sys
def create_list( ):
    f = open(sys.argv[1])
    edges = [ ]
    for line in f:
        n1, n2, cost = line.split(',')
        edges.append((n1, n2, int(cost)))
    return edges
def cost_sort(unsorted_list):
    return sorted(unsorted_list, key=lambda x: x[2])
def discover_topology(edge_list):
    def upper_bound(cost):
        # create a new level if the cost is > 50% of current cost
        return (cost) * 150 / 100
    # sort the list of edges in the ascending order of cost
    edges = cost_sort(edge_list)
    Topo = { }
    level = 0
    cost = 0
    for edge in edges:
        # create new level if the edge's cost is much higher
        # than current cost
        if edge[2] >= upper_bound(cost):
            level += 1
            cost = edge[2]
            Topo[level] = [ ]
        # add to an existing group if linked else create new group in
        # current level
        for i in range(len(Topo[level])):
            if not Topo[level] [i]:
                continue
            if edge[0] in Topo[level] [i] or edge[1] in Topo[level] [i]:
                Topo[level] [i].add(edge[0])
                Topo[level] [i].add(edge[1])
                break
            else:
                Topo[level].append(set(edge[0:2]))
    return level, Topo
if __name__ == "__main__":
    levels, topo = discover_topology(create_list( ))
    for i in range(1, levels + 1):
        print "Level:%d" % i
        for k, grp in enumerate(topo[i]):
            print " " * i, k, ":", sorted(list(grp))
```

By applying the above algorithm to table 300, controller 24 may generate the following data structures:
Output:
Level:1
  0: ['A1B1H2', 'A1B1H1']
  1: ['A2B3H6', 'A2B3H5']
  2: ['A1B2H4', 'A1B2H3']
Level:2
  0: ['A1B2H3', 'A1B2H4', 'A1B1H1', 'A1B1H2']
Level:3
  0: ['A2B3H5', 'A2B3H6', 'A1B1H1', 'A1B1H2', 'A1B2H3', 'A1B2H4']

Each of A1, A2 may represent a chassis switch; each of B1-B3 may represent a TOR switch; and each of H1-H6 may represent a different host device, such as any of servers 12 of FIG. 1. As indications of per host per TOR switch topology for the data center network, groups of Level:1 may be input to determine List C described above with respect to FIG. 3A. As indications of per host per TOR switch per chassis switch topology for the data center network, groups of Level:2 may be input to determine List D described above with respect to FIG. 3A. Level:3 determined by controller 24 describes the switch topology under the IP fabric.

By combining the network topology of the physical network interconnecting hosts of the data center, as determined in some examples using the above algorithm, with the topology of the virtual hardware components obtained by controller 24, controller 24 may generate data structures for use in orchestrating VNFs by, in part, selecting hosts and assigning VNFs to the selected hosts. Examples of such data structures are Lists A-D described above with respect to FIG. 3A.

Figure 7:
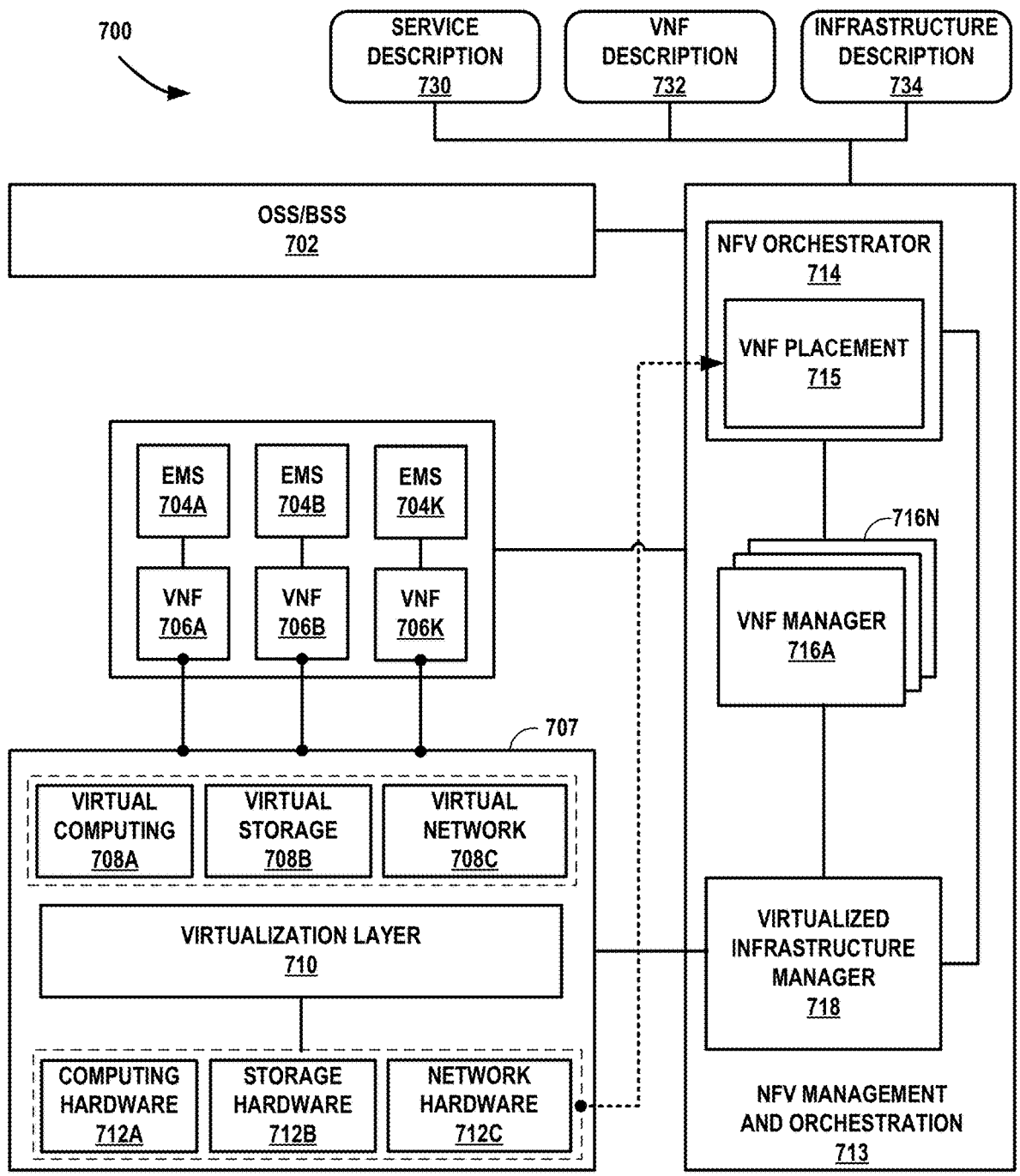
FIG. 7 is a block diagram illustrating an NFV architectural framework, according to techniques described in this disclosure.

FIG. 7 is a block diagram illustrating an NFV architectural framework, according to techniques described in this disclosure. Framework 700 may be implemented using one or more distributed computing devices. Framework 700 includes NFV Management Orchestration 713 having an NFV orchestrator 714, one or more VNF managers 716A-716N, and virtualized infrastructure manager 718. NFV Management and Orchestration 713 may be implemented by any of controllers 24 described herein.

Framework 700 also includes Operations and Business Support Systems (OSS/BSS) 702, multiple VNFs 706A-706K and corresponding Element Management Systems (EMSs) 704A-704K, and NFVI 707. NFVI 707 includes computing hardware 712A, storage hardware 712B, and network hardware 712C for executing VNFs 706. NFVI 707 further includes a virtualization layer 710 over the hardware to offer virtual computing 708A, virtual storage 708B, and virtual network 708C for executing VNFs 706 using virtual environments.

Service description 730, VNF description 732, and infrastructure description 734 provide information regarding the VNF deployment templates, VNF forwarding graphs, service-related information, and NFVI information models. Infrastructure description 734 may describe the multi-layer switch hierarchy for a data center that includes the NFVI network infrastructure. Infrastructure description 734 may include, for example, Lists A-D. Service description 730 may include network service descriptors in some cases extended to include intra-network service and inter-network service weights.

NFV Orchestrator 714 may be executed by one or more computing devices in a centralized or distributed manner. In accordance with techniques described herein, NFV orchestrator 714 includes an VNF placement module 715 that uses infrastructure description 734, VNF description 732, and service description 730 to select input/output methods for VNFs of a network service and select a host device to host the VNFs for the network service to realize the selected input/output methods for the VNFs. VNF placement module 715 may operate with respect to multiple network services. In addition to selecting host devices, in some examples, VNF placement module 715 may use infrastructure description 734, VNF description 732, and service description 730 adjacent VNFs to NFVI, specifically, virtual hardware components, that are logically near to one another in a multi-layer switch hierarchy of the data center.

FIG. 8 is a table describing characteristics of different types of switching provided by network virtualization function infrastructure. Network services and virtualized network functions thereof may have different requirements that depend on the type of VNF, the security, and level of abstraction of the virtual machine for the VNF from the hardware, and the position of the VNF within the network service (e.g., the first VNF in the network service, second VNF in the network service, etc.) as traversed by data traffic processed by the network service. Common requirements include throughput, both maximum throughput between the NIC and the VM as well as intra-host throughput between VMs (and corresponding VNFs). Each columns of table 780 lists characteristics of a different virtual machine packet input/output method that is indicated by the corresponding switching type within a host device.

The SR-IOV column indicates that SR-IOV provides the highest throughput from among the switching types, with near native throughput provided by input/output being delivered directly to the virtual machine. However, SR-IOV has more limited inter-VM bandwidth due to limited NIC switching and PCIe bus bandwidth. In addition, SR-IOV ties a virtual machine to a specific hardware port (e.g., virtual function), which limits migration and the VM needs to have a proper SR-IOV driver to make use of a virtual function. Still further, SR-IOV provides limited security because inter-VM packets are switched by the NIC and not a software-based switch. SR-IOV is also limited by the number of available virtual functions, which a controller 24 may monitor and adjust as described elsewhere in this disclosure. Computing device 200 of FIG. 4A that implements SR-IOV may offer switching characteristics as indicated in the SR-IOV column.

The Open Virtual Switch with Data Plane Development Kit column indicates that OVS with DPDK enabled provides high throughput, though less than SR-IOV. In addition, OVS with DPDK enabled has much higher inter-VM throughput than SR-IOV with such throughput being scalable with additional CPU cores. VMs configured to use OVS with DPDK enabled may be migrated among host devices. Like SR-IOV however, VMs must have the DPDK driver in order to use OVS with DPDK enabled of the host device. OVS with DPDK enabled also enables security policies to be applied. Computing device 250 of FIG. 4B that implements OVS with DPDK enabled may offer switching characteristics as indicated in the Open Virtual Switch with Data Plane Development Kit column.

The Standard Open Virtual Switch/Linux bridges column indicates that both standard OVS and software bridges, as provided as in the examples of computing devices 270, 290, respectively, offer relatively low throughput for both inter-host and intra-host switching. However, standard OVS has higher throughput than a Linux software bridge. Both standard OVS and Linux software bridges offer live migration among host devices, are widely supported by VMs with available software abstractions, and enable security policies to be applied.

Figure 9:
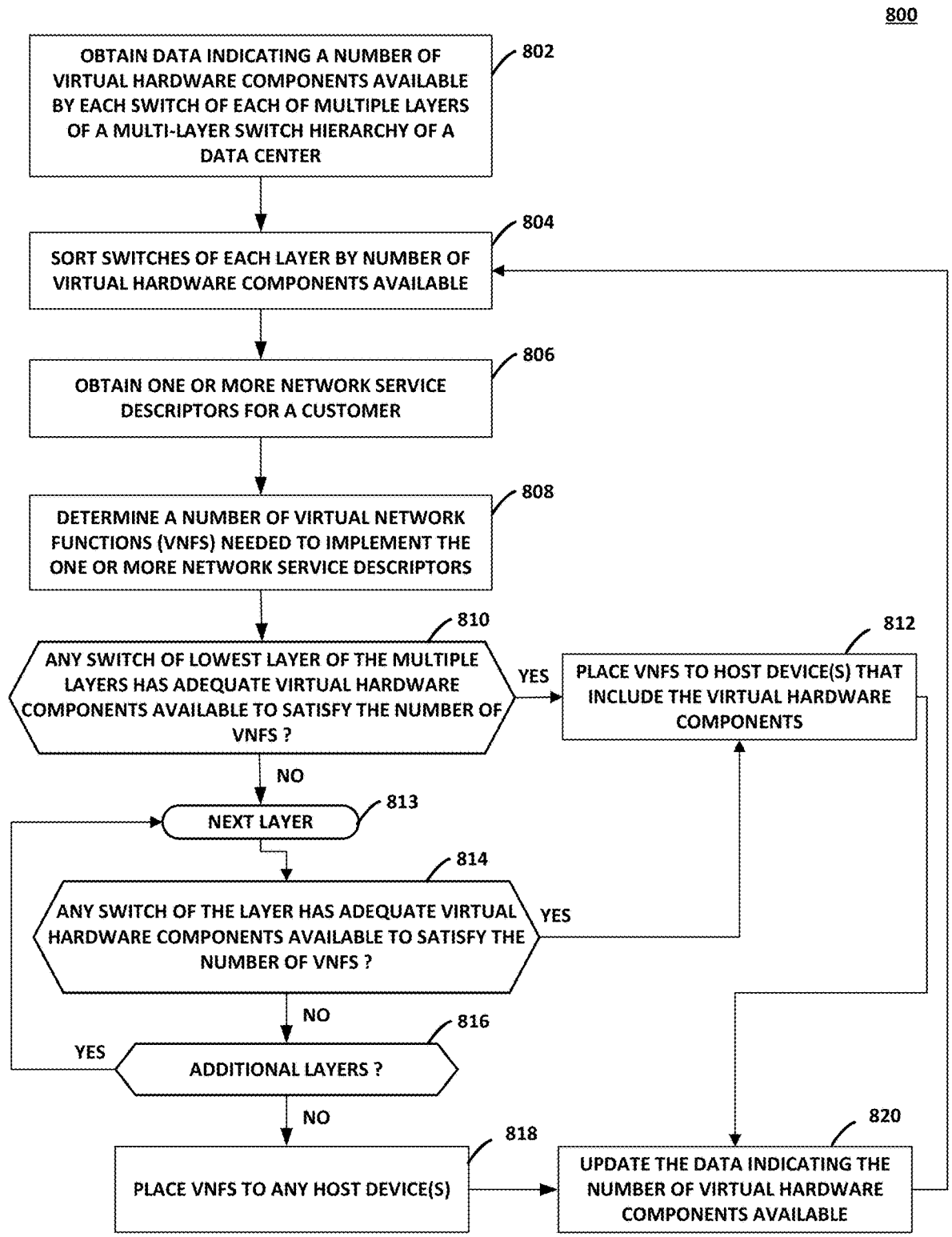
FIG. 9 is a flowchart illustrating an example mode of operation for a controller to select types of switching and a host computing device for virtualized network functions, in accordance with techniques described in this disclosure.

FIG. 9 is a flowchart illustrating an example mode of operation for a controller to select types of switching and a host computing device for virtualized network functions, in accordance with techniques described in this disclosure. Operation 800 may be performed by controller 24, computing devices that execute any of NFV management and orchestration 713, or another computing device executing an application to place VNFs of network services. However, operation 800 is described with respect to controller 24. In general, operation 800 may follow a worst fit allocation ascending the multi-layer switch hierarchy to distribute load across the hosts and allow space for customers' network services expansion.

For a customer, the network service descriptors for customer network services indicate an approximate upper bound of VNFs (and corresponding I/O interfaces that may be implemented using virtual hardware components of data center 10, e.g., virtual functions of SR-IOV devices). This upper bound for customer sites and a customer-specific ("site-general") network service for a customer-n may be represented as: customer-n: {site-1:[10], site-2:[6], . . . site-general:[8]}, with the upper bound of VNFs indicated in brackets. With these network services VNF requirements for a customer, with intra-network service and inter-network service adjacencies, the controller 24 may apply operation 800 to look up available VNFs and place the network services for customer 8 based on data indicating virtual hardware components available "under" a given switch in the multi-layer switching hierarchy.

Controller 24 may obtain data indicating a number of virtual hardware components available by each switch of each layer of multiple layers of a multi-layer switch hierarchy of a data center (802). This data may take the form of Lists A-D, described above with respect to FIG. 3B, which each indicates available virtual hardware components (e.g., virtual functions) by different switches at each level of the multi-layer switch hierarchy. Controller 802 may sort the switches at each layer (e.g., each of Lists A-D) in descending order by the number of virtual hardware components available (804).

Controller 24 may obtain one or more network service descriptors for a customer (806). Based on the network service descriptors and VNF description 732 that may indicate a number of virtual hardware components for each VNF, controller 24 may determine a number of VNFs needed to implement each of the one or more network service descriptors (808).

Starting at the lowest layer of the multi-layer switch hierarchy, controller 24 determines, based on the data obtained in step 802 sorted in step 804 in descending order, whether any switch of the lowest layer of the multi-layer switch hierarchy (which describes hardware components themselves, e.g., SR-IOV devices) has available virtual hardware components to implement all of the network services described by the one or more network service descriptors (810). This may include traversing List A in descending order to find the first switch with available virtual hardware components. If there is a switch with available virtual hardware components (YES branch of 812), controller 24 orchestrates the VNFs for the network services by, in part, placing the VNFs to the switch with the available virtual hardware components (812). "Placing" a VNF to a virtual hardware component may refer to configuring a host that includes the virtual hardware component to execute the VNF using the virtual hardware component. After placing the VNFs, controller 24 updates the data obtained in step 802 to reflect that one or more of the virtual hardware components are being used to implement the VNFs of the one or more network services, such as by reducing the number of available virtual hardware components in any of Lists A-D (820).

If there is no switch at the lowest layer with available virtual hardware components (YES branch of 812), controller 24 reviews the data for switches of the next higher layer and determines whether any of switch of the layer has adequate virtual hardware components to meet the one or more network services' VNFs requirements (814). This may include traversing List B in descending order to find the first switch with available virtual hardware components. If so (YES branch of 814), controller 24 places the VNFs (812) to host devices that are endpoint devices of the first switch and updates the data indicating the number of available virtual hardware components (820). If not (NO branch of 814), controller 24 reviews the data for switches at the next highest layer of the multi-layer switch (813) if there are higher layers remaining (YES branch of 816). If no switch at any layer of the multi-layer switch component has adequate available virtual hardware components under it (NO branch of 816), controller 24 may place the VNFs to any host devices of the data center (818) and update the data indicating the number of available virtual hardware components (820).

With respect to Lists A-D described above with respect to FIG. 3B, controller 24 may apply the below algorithm, expressed using pseudocode:

Lookup on list[A], to see if any SR-IOV device has enough free #{virtual functions (VFs)} to fit all the network services for the customer.
   If yes, return the SR-IOV devid, and adjust the position of this device id in list[A] if succeeding nodes have more free #VFs.
   Else: lookup on list[B], to see if each of the sites network services can be fit in SR-IOV devices of a host.
     If yes, return the host and its SR-IOV devices. Adjust the position of the host in list[B] and position of the SR-IOV devices in list[A]
     Else: lookup on list[C], to see if each of the sites network services can be fit in SR-IOV devices belonging to hosts within a TOR-switch.
       If yes, return the selected hosts and its SR-IOV devices. Adjust the positions of the TOR switch in list[C], hosts in list[B], and the SR-IOV devices in list[A].
       Else: lookup on list[D], to see if each of the sites can be fit in SR-IOV devices belonging to hosts within a Spine-switch.
         If yes, return the selected hosts and its SR-IOV devices. Adjust the positions of the Spine switch in list[D], TOR switches in list[C], hosts in list[B], and the SR-IOV devices in list[A].
         Else: Assign any available #@VFs across the data center. Adjust Lists A, B, C, and D to account for the allocation.

Operation 800 may cause controller 24 to place network services to the least-loaded hosts, thereby spreading the VNF load uniformly across the data center. This may allow for adding VNFs to existing network services of a customer as well as adding network services for a customer. Operation 800 may be modified to perform a "best fit" rather than a "worst fit," i.e., by ascending the multi-layer switch hierarchy and, e.g., traversing Lists A-D in ascending order to more densely pack VNFs into hosts and therefore keep more hosts idle and in power-saving mode to save power.

Figure 10:
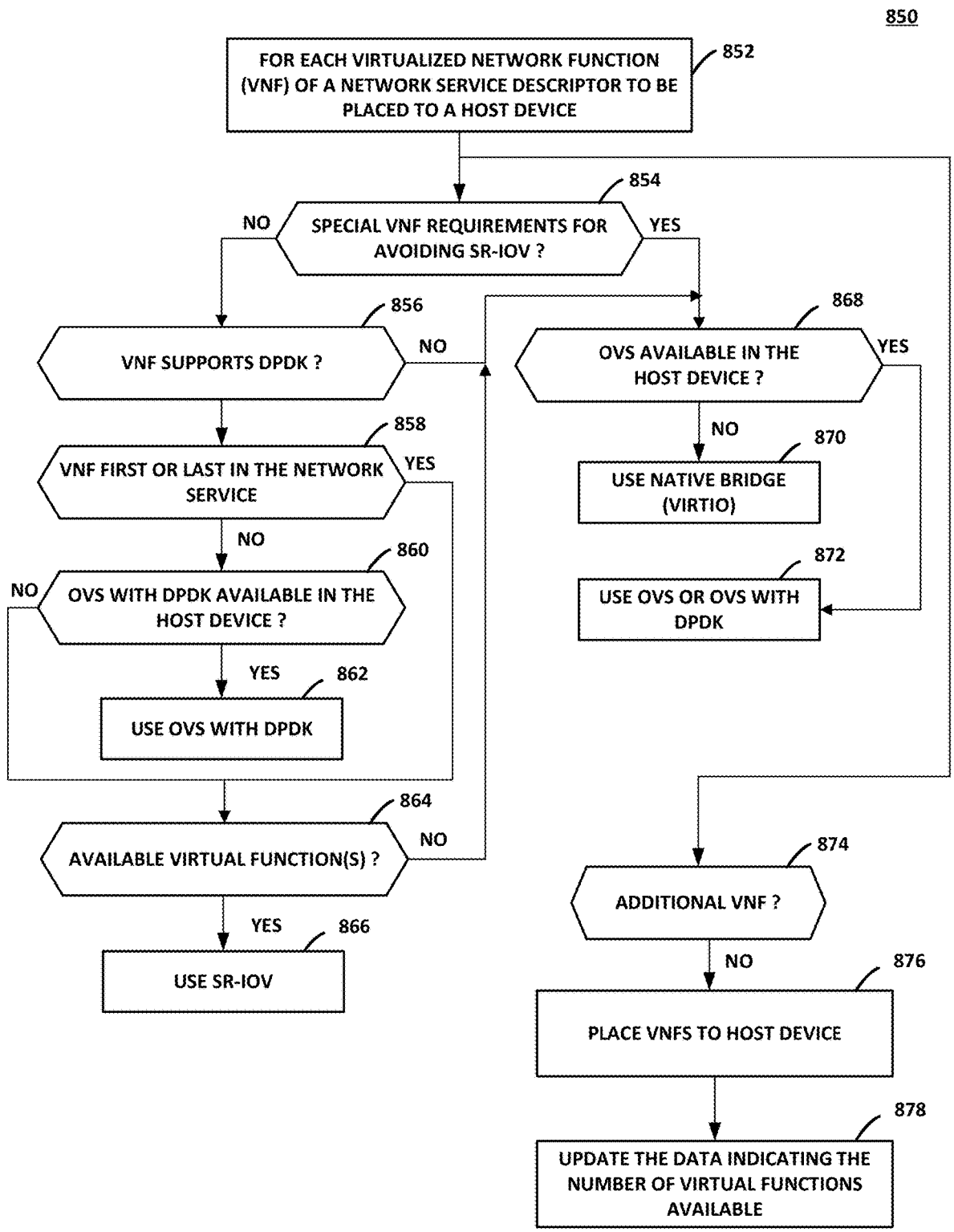
FIG. 10 is a flowchart illustrating an example mode of operation for a controller to select types of packet input/output for respective virtualized network functions of a network service, according to techniques described in this disclosure.

FIG. 10 is a flowchart illustrating an example mode of operation for a controller to select types of packet input/output for respective virtualized network functions of a network service, according to techniques described in this disclosure. Operation 850 may be performed by controller 24, computing devices that execute any of NFV management and orchestration 713, or another computing device executing an application to place VNFs of network services. However, operation 850 is described with respect to controller 24.

In general, if a VNF requires security or migration or the VNF package does not support SR-IOV then controller 24 provisions the VNF to a host device to use a form of OVS or, if that is not available, a software bridge for switching and packet I/O. If the VNF supports SR-IOV and runs a DPDK-supported application, then controller 24 optionally provisions the VNF to use SR-IOV or OVS with DPDK enabled, as determined by the position of the VNF in the service chain of the network service that specifies the VNF.

If the VNF is the first or last VNF in a service chain of a network service, controller 24 provisions the VNF to use the first available switching type listed below:
1. SR-IOV
2. OVS with DPDK enabled
3. Standard OVS
4. Linux bridge If the VNF is in the middle of a service chain of a network service (i.e., not first or last), controller 24 provisions the VNF to use the first available switching type listed below:
1. OVS with DPDK enabled
2. SR-IOV
3. Standard OVS
4. Linux bridge The principles of VNF switch type selection outlined above are represented in mode of operation 850. Controller 24 may perform a set of operations to obtain data indicating a number of virtual hardware components available by each switch of each layer of multiple layers of a multi-layer switch hierarchy of a data center. This data may take the form of Lists A-D, described above with respect to FIG. 3B, which each indicates available virtual hardware components (e.g., virtual functions) by different switches at each level of the multi-layer switch hierarchy. Controller 802 may sort the switches at each layer (e.g., each of Lists A-D) in descending order by the number of virtual hardware components available.

Controller 24 may obtain a network service descriptor for a network service and determine a preferred input/output method and switching type for each of the virtualized network functions needed to implement the network service (852). The network service descriptor may include respective VNF descriptors for the VNFs that indicate VNF requirements with respect to security and migration. A VNF described by a VNF descriptor may or may not support SR-IOV, which may be indicated by the VNF descriptor or by the VNF package described by the VNF descriptor.

Controller 24 may apply operations of mode of operation 850 for each VNF to be placed (852). For a VNF, if the host device or VNF package does not support SR-IOV or requires additional security to be applied by a software switch or requires support for VNF migration to another host device (YES branch of 854), then controller 24 selects to provision the VNF to use OVS (872) if OVS is available in the host device (YES branch of 868) but selects to provision the VNF to use a software bridge (virtio) (870) if an OVS is not available in the host device (NO branch of 868). In some examples, the virtual network function descriptor (e.g., vnfd) for a VNF may specify a type of switch/corresponding packet input/output method to be used by the VNF for virtual network packet switching within the host device. For instance, the virtual network function descriptor for a VNF may specify that the VNF is to be configured to use OVS with DPDK only, configured to use SR-IOV only, or configured to use any one of a list of multiple input/output method options. The virtual network function descriptor may include a field or attribute that provides this indication for the VNF. In such examples, controller 24 may select the specified option (if there is a single required input/output method) (862, 866, 870, 872) or apply mode of operation 850 in a modified manner to select from the list of input/output method options (if the virtual network function descriptor specifies a list of multiple options).

If there are no special VNF requirements for the VNF to avoid using SR-My (NO branch of 854), controller 24 determines whether the VNF supports DPDK (856). If not (NO branch of 856), then controller 24 performs operation 868 to determine whether OVS is available in the host device.

Otherwise (YES branch of 856), the VNF can use SR-IOV or DPDK. Controller 24 therefore determines the position of the VNF in the service chain for the network service. If the VNF is a terminal VNF (i.e., is positioned first or last in the service chain) (YES branch of 858), controller 24 selects to provision the VNF to use SR-IOV (866) if there are available virtual functions (the number needed to support the VNF) on the host device (YES branch of 864). In some cases, to ensure that the VNFs of the network service are placed to a single host, the controller 24 may first accumulate the number of virtual functions required for the first and last VNFs (if OVS with DPDK enabled is available) or for all VNFs (if OVS with DPDK enabled is not available), and controller 24 may use the accumulation to determine whether the host device has sufficient VFs available to support the network service (864).

If the VNF is positioned in the middle of the service chain (NO branch of 858) and an OVS with DPDK enabled switch is supported by the host device (YES branch of 860), then controller 24 selects to provision the VNF to use an OVS with DPDK enabled switch for packet I/O (862). If no OVS with DPDK enabled switch is supported by the host device (NO branch of 860), then controller 24 selects to provision the VNF to use SR-IOV (866) if there are available virtual functions (the number needed to support the VNF) on the host device (YES branch of 864).

Once the switch type to be used for packet I/O by the VNF is selected, controller 24 determines whether the switch type for additional VNFs for the network service are to be determined. If not (NO branch of 874), controller 24 may place the VNFs to the host device (876) and update the data indicating the number of available virtual functions (880).

Once the controller 24 determines, for each VNF, the type of packet I/O to be used by the VNF, controller 24 may select and provision the VNFs to a host device that supports all of the determined switching types for packet I/O for the VNFs. The controller 24 may use the capabilities indications from List B to identify host devices that offer OVS, OVS with DPDK enabled, and/or software bridging. The controller 24 may use List B to determine the number of VFs available on each host device.

Mode of operation 850 may increase the number of host devices under consideration for placement of the VNFs that have the requisite number of virtual functions. Because only the terminal VNFs are provisioned to use SR-IOV for packet input/output and switching when OVS with DPDK enabled switches are available on the host device, controller 24 may place the network service to any host device that has the number of virtual functions available to support the first VNF and the last VNF in the service chain for the network service. If the first VNF and the last VNF require only 1 VF each, for instance, then the network service may be placed to a host device that has just 2 available VFs. Mode of operation 850 may also conserve the number of VFs utilized by the controller 24 for provisioning network services.

Controller 24 may apply mode of operation 800 before or after applying mode of operation 850 in order to place VNFs logically near to one another according to the various strengths of adjacency, as described in this disclosure. For example, controller 24 may apply mode of operation 800 after selecting a host computing device in order place VNFs of a network service to use virtual functions associated with a single NIC of the host computing device. As another example, controller 24 apply mode of operation 800 select a single host or one or more hosts under a single switch to execute multiple different network services.

Figure 11:
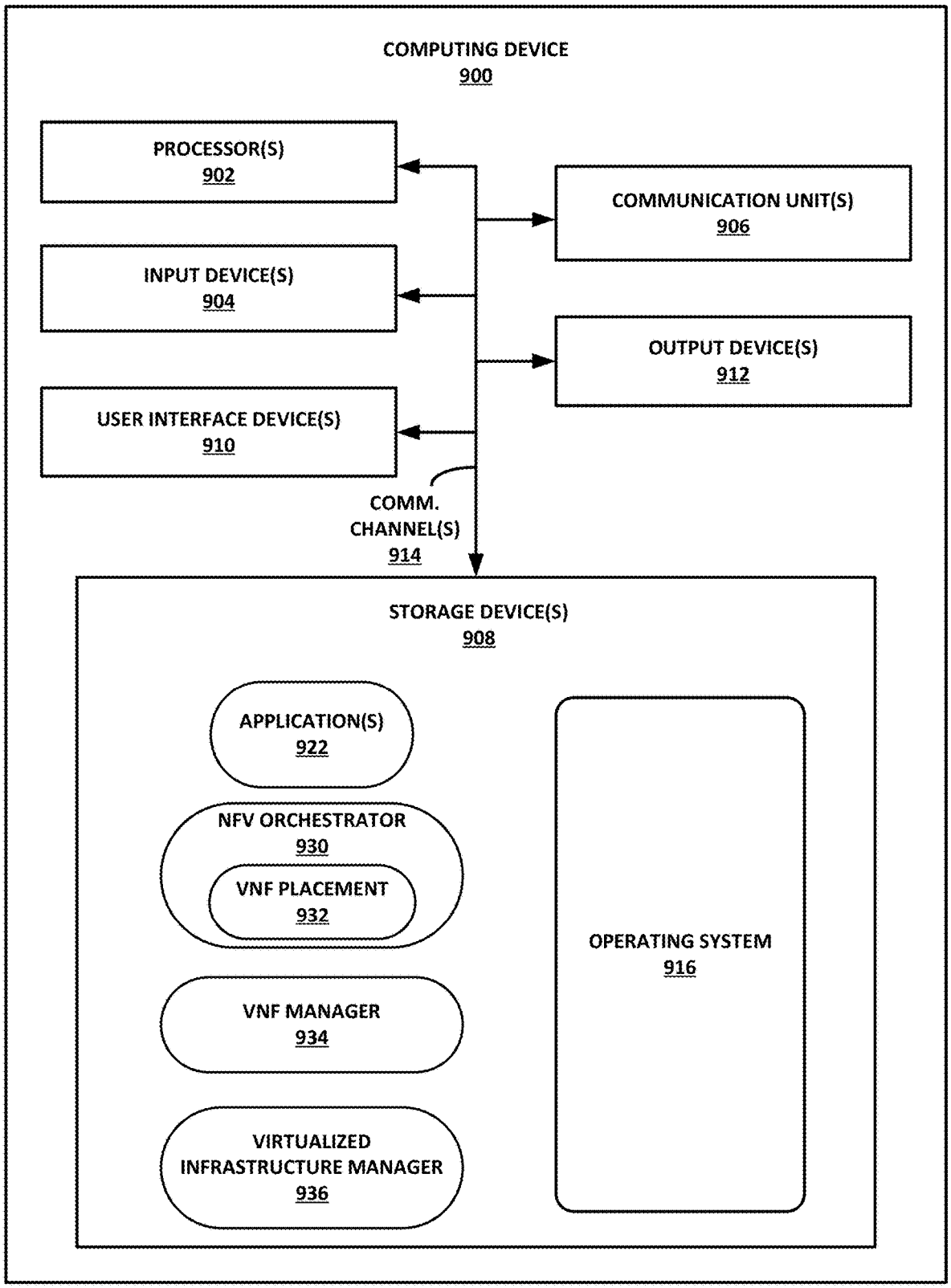
FIG. 11 is a block diagram illustrating further details of one example of a computing device that operates in accordance with one or more techniques of the present disclosure.

FIG. 11 is a block diagram illustrating further details of one example of a computing device that operates in accordance with one or more techniques of the present disclosure. FIG. 11 may illustrate a particular example of a server or other computing device 900 that includes one or more processor(s) 902 for executing any one or more of controller 24, a computing device that implements one or more aspects of NFV management and orchestration 713, or another computing device described herein. Other examples of computing device 900 may be used in other instances. Although shown in FIG. 11 as a stand-alone computing device 900 for purposes of example, a computing device may be any component or system that includes one or more processors or other suitable computing environment for executing software instructions and, for example, need not necessarily include one or more elements shown in FIG. 11 (e.g., communication units 906; and in some examples components such as storage device(s) 908 may not be co-located or in the same chassis as other components).

As shown in the specific example of FIG. 11, computing device 900 includes one or more processors 902, one or more input devices 904, one or more communication units 906, one or more output devices 912, one or more storage devices 908, and user interface (UI) device 910, and communication unit 906. Computing device 900, in one example, further includes one or more applications 922 and one or more of NFV orchestrator 930, VNF manager 932, virtualized infrastructure manager 936, and operating system 916 that are executable by computing device 900. Each of components 902, 904, 906, 908, 910, and 912 are coupled (physically, communicatively, and/or operatively) for inter-component communications. In some examples, communication channels 914 may include a system bus, a network connection, an inter-process communication data structure, or any other method for communicating data. As one example, components 902, 904, 906, 908, 910, and 912 may be coupled by one or more communication channels 914.

Processors 902, in one example, are configured to implement functionality and/or process instructions for execution within computing device 900. For example, processors 902 may be capable of processing instructions stored in storage device 908. Examples of processors 902 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 908 may be configured to store information within computing device 900 during operation. Storage device 908, in some examples, is described as a computer-readable storage medium. In some examples, storage device 908 is a temporary memory, meaning that a primary purpose of storage device 908 is not long-term storage. Storage device 908, in some examples, is described as a volatile memory, meaning that storage device 908 does not maintain stored contents when the computer is turned off. Examples of volatile memories include random access memories (RAM), dynamic random access memories (DRAM), static random access memories (SRAM), and other forms of volatile memories known in the art. In some examples, storage device 908 is used to store program instructions for execution by processors 902. Storage device 908, in one example, is used by software or applications running on computing device 900 to temporarily store information during program execution.

Storage devices 908, in some examples, also include one or more computer-readable storage media. Storage devices 908 may be configured to store larger amounts of information than volatile memory. Storage devices 908 may further be configured for long-term storage of information. In some examples, storage devices 908 include non-volatile storage elements. Examples of such non-volatile storage elements include magnetic hard disks, optical discs, floppy disks, Flash memories, or forms of electrically programmable memories (EPROM) or electrically erasable and programmable (EEPROM) memories.

Computing device 900, in some examples, also includes one or more communication units 906. Computing device 900, in one example, utilizes communication units 906 to communicate with external devices via one or more networks, such as one or more wired/wireless/mobile networks. Communication units 906 may include a network interface card, such as an Ethernet card, an optical transceiver, a radio frequency transceiver, or any other type of device that can send and receive information. Other examples of such network interfaces may include 3G and WiFi radios. In some examples, computing device 900 uses communication unit 906 to communicate with an external device.

Communication units 906 may receive service description 730, VNF description 732, and/or infrastructure description 734, which may be stored by storage devices 908. Computing device 900, in one example, also includes one or more user interface devices 910. User interface devices 910, in some examples, are configured to receive input from a user through tactile, audio, or video feedback. Examples of user interface devices(s) 910 include a presence-sensitive display, a mouse, a keyboard, a voice responsive system, video camera, microphone or any other type of device for detecting a command from a user. In some examples, a presence-sensitive display includes a touch-sensitive screen.

One or more output devices 912 may also be included in computing device 900. Output device 912, in some examples, is configured to provide output to a user using tactile, audio, or video stimuli. Output device 912, in one example, includes a presence-sensitive display, a sound card, a video graphics adapter card, or any other type of device for converting a signal into an appropriate form understandable to humans or machines. Additional examples of output device 912 include a speaker, a cathode ray tube (CRT) monitor, a liquid crystal display (LCD), or any other type of device that can generate intelligible output to a user.

Computing device 900 may include operating system 916. Operating system 916, in some examples, controls the operation of components of computing device 900. For example, operating system 916, in one example, facilitates the communication of one or more applications with processors 902, communication unit 906, storage device 908, input device 904, user interface devices 910, and output device 912.

NFV orchestrator 930 includes a VNF placement module 932 for execution by processors 902 to select input/output methods for VNFs of a network service and select a host device to host the VNFs for the network service to realize the selected input/output methods for the VNFs, in accordance with techniques described above. For example, communication units 906 may detect data for a network service (e.g., a network service descriptor) that specifies one or more VNFs. Processors 902 executing VNF placement module 715 review infrastructure description 734, such as Lists A-D described above, to select the input/output methods for the VNFs that determine the switch type used by the packet data exchanged by the VNF with the host switch. VNF placement module 715 may apply modes of operation described herein, including modes of operation 800 and 850.

In addition to selecting host devices, in some examples, VNF placement module 715 may select host devices and virtual hardware components to implement VNFs of network services. For example, VNF placement module 932 may determine VNFs for networks services using network service descriptors received by communication units 906. VNF placement module 932 may identify available virtual hardware components in the data center host devices for implementing the VNFs using data received by communication units 906 that indicates properties of a multi-layer switch hierarchy of a data center. VNF placement module 932 may select available virtual hardware components to implement the VNFs and configure host devices that include the virtual hardware components to host the VNFs.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
obtaining, by a controller for network function virtualization infrastructure (NFVI), network description data indicating, for each computing device of a plurality of computing devices of the NFVI, one or more types of switches for virtual network packet switching that are configured within the computing device, wherein the plurality of computing devices comprise servers of the NFVI;
receiving, by the controller, a network service descriptor that specifies a plurality of virtualized network functions (VNFs);
selecting, by the controller for each VNF of the plurality of VNFs, a type of switch to be used to switch packets sent by or to be received by the VNF, wherein the type of switch is selected from a plurality of different types of switches that each applies a different switching method and that perform virtual network packet switching within at least one of the plurality of computing devices of the NFVI;
selecting, by the controller based on the type of switch selected for each VNF of the plurality of VNFs and based on the network description data, a computing device of the plurality of computing devices to execute the VNF; and
configuring, by the controller, for each VNF of the plurality of VNFs, the selected computing device to use the type of switch selected for the VNF.

2. The method of claim 1, wherein selecting a type of switch to be used to switch packets sent by or to be received by the VNF comprises:
selecting, by the controller for each VNF of the plurality of VNFs, in response to determining the VNF is one of a first VNF or a last VNF in a service chain described by the network service descriptor, a Single Root Input/Output Virtualization type of switch to be used to switch packets sent by or to be received by the VNF; and
selecting, by the controller for each VNF of the plurality of VNFs, in response to determining the VNF is not one of a first VNF or a last VNF in the service chain described by the network service descriptor, a software switch type of switch to be used to switch packets sent by or to be received by the VNF.

3. The method of claim 2, wherein the software switch type of switch comprises Open vSwitch with Data Plane Development Kit enabled.

4. The method of claim 1, wherein selecting a type of switch to be used to switch packets sent by or to be received by the VNF comprises:
if the VNF is one of a first VNF or a last VNF in a service chain described by the network service descriptor, selecting a first available type of switch from a first ordered list comprising: i) Single Root Input/Output Virtualization, ii) Open vSwitch with Data Plane Development Kit enabled, iii) standard Open vSwitch, and iv) software bridging; and
if the VNF is not one of a first VNF or a last VNF in the service chain described by the network service descriptor, selecting a first available type of switch from a second ordered list comprising: i) Open vSwitch with Data Plane Development Kit enabled, ii) Single Root Input/Output Virtualization, iii) standard Open vSwitch, and iv) software bridging.

5. The method of claim 1, further comprising:
selecting, by the controller based at least on the network description data, a single computing device to host each VNF of the plurality of VNFs,
wherein the one or more of the computing devices comprise the single computing device.

6. The method of claim 5,
wherein the computing device comprises one or more physical network interface cards, wherein each of the physical network interface cards implements one or more virtual hardware components as a virtualization of the physical network interface card,
wherein the network description data comprises at least one list indicating a number of virtual hardware components available on each of the plurality of computing devices, and
wherein selecting the single computing device to host each VNF of the plurality of VNFs comprises selecting, by the controller, the single computing device in response to determining the at least one list indicates the single computing device comprises sufficient virtual hardware components to host each VNF of the plurality of VNFs with the types of switches selected for the plurality of VNFs.

7. The method of claim 1, wherein the types of switches comprise i) Single Root Input/Output Virtualization, ii) Open vSwitch with Data Plane Development Kit enabled, iii) standard Open vSwitch, and iv) software bridging.

8. The method of claim 1, wherein the network description data comprises at least one list indicating one or more types of switches for virtual network packet switching that are configured within each computing device of the plurality of computing devices of the NFVI.

9. The method of claim 1,
wherein a virtualized network function descriptor for a VNF of the plurality of VNFs specifies the type of switch to be used to switch packets sent by or to be received by the VNF,
wherein selecting a type of switch to be used to switch packets sent by or to be received by the VNF comprises selecting, by the controller for the VNF, the type of switch to be used to switch packets sent by or to be received by the VNF that is specified by the virtualized network function descriptor for the VNF.

10. The method of claim 1,
wherein the network service descriptor specifies at least three VNFs and comprises a virtual link descriptor for each pair of adjacent VNFs specified by the network service descriptor, wherein the virtual link descriptor for each pair of adjacent VNFs includes a weight value that indicates a strength of an adjacency between the pair of adjacent VNFs,
wherein configuring the one or more computing devices comprises placing, by the controller based on the weights for the pairs of adjacent VNFs, a pair of adjacent VNFs with a weight value that indicates a high strength of adjacency to a same computing device and placing a pair of adjacent VNFs with a weight value that indicates a lower strength of adjacency to different computing devices.

11. The method of claim 1, wherein the network service descriptor comprises a first network service descriptor, the method further comprising:
receiving, by the controller, a second network service descriptor that specifies one or more VNFs to be instantiated to the NFVI;
identifying, based on the network description data after the selecting, the first network service descriptor, and the second network service descriptor, a lowest-level switch of a multi-layer switch hierarchy of the NFVI that has available virtual hardware components to implement all of the VNFs specified by any of the first network service descriptor and the second network service descriptor,
wherein the configuring comprising placing, by the controller, the VNFs specified by any of the first network service descriptor and the second network service descriptor in part by placing the VNFs specified by any of the first network service descriptor and the second network service descriptor to one or more computing devices that include the available virtual hardware components that belong to the identified lowest-level switch.

12. The method of claim 1, wherein selecting, by the controller based on the type of switch selected for each VNF of the plurality of VNFs and based on the network description data, a computing device of the plurality of computing devices to execute the VNF comprises:
selecting the computing device in response to determining, based on the network description data indicating a type of switch that is configured within the computing device, the type of switch selected for the VNF is configured within the computing device.

13. A controller for network function virtualization infrastructure (NFVI), the controller comprising one or more processors operably coupled to a memory and configured to:
obtain, for the NFVI, network description data indicating, for each computing device of a plurality of computing devices of the NFVI, one or more types of switches for virtual network packet switching that are configured within the computing device, wherein the plurality of computing devices comprise servers of the NFVI;
receive a network service descriptor that specifies a plurality of virtualized network functions (VNFs);
select, for each VNF of the plurality of VNFs, a type of switch to be used to switch packets sent by or to be received by the VNF, wherein the type of switch is selected from a plurality of different types of switches that each applies a different switching method and that perform virtual network packet switching within at least one of the plurality of computing devices of the NFVI;
select, based on the type of switch selected for each VNF of the plurality of VNFs and based on the network description data, a computing device of the plurality of computing devices to execute the VNF; and
configure, for each VNF of the plurality of VNFs, the selected computing device to use the type of switch selected for the VNF.

14. The controller of claim 13, wherein the one or more processors operably coupled to a memory are configured to:
select, for each VNF of the plurality of VNFs, in response to a determination the VNF is one of a first VNF or a last VNF in a service chain described by the network service descriptor, a Single Root Input/Output Virtualization type of switch to be used to switch packets sent by or to be received by the VNF; and
select, for each VNF of the plurality of VNFs, in response to a determination the VNF is not one of a first VNF or a last VNF in the service chain described by the network service descriptor, a software switch type of switch to be used to switch packets sent by or to be received by the VNF.

15. The controller of claim 14, wherein the software switch type of switch comprises Open vSwitch with Data Plane Development Kit enabled.

16. The controller of claim 13, wherein the one or more processors operably coupled to a memory are configured to:
if the VNF is one of a first VNF or a last VNF in a service chain described by the network service descriptor, select a first available type of switch from a first ordered list comprising: i) Single Root Input/Output Virtualization, ii) Open vSwitch with Data Plane Development Kit enabled, iii) standard Open vSwitch, and iv) software bridging; and
if the VNF is not one of a first VNF or a last VNF in the service chain described by the network service descriptor, select a first available type of switch from a second ordered list comprising: i) Open vSwitch with Data Plane Development Kit enabled, ii) Single Root Input/Output Virtualization, iii) standard Open vSwitch, and iv) software bridging.

17. The controller of claim 13, wherein the one or more processors operably coupled to a memory are configured to:

select, based at least on the network description data, a single computing device to host each VNF of the plurality of VNFs,
wherein the one or more of the computing devices comprise the single computing device.

18. The controller of claim 17,
wherein the computing device comprises one or more physical network interface cards, wherein each of the physical network interface cards implements one or more virtual hardware components as a virtualization of the physical network interface card,
wherein the network description data comprises at least one list indicating a number of virtual hardware components available on each of the plurality of computing devices, and
wherein the one or more processors operably coupled to a memory are configured to select the single computing device in response to determining the at least one list indicates the single computing device comprises sufficient virtual hardware components to host each VNF of the plurality of VNFs with the types of switches selected for the plurality of VNFs.

19. The controller of claim 13, wherein the types of switches comprise i) Single Root Input/Output Virtualization, ii) Open vSwitch with Data Plane Development Kit enabled, iii) standard Open vSwitch, and iv) software bridging.

20. The controller of claim 13, wherein the network description data comprises at least one list indicating one or more types of switches for virtual network packet switching that are configured within each computing device of the plurality of computing devices of the NFVI.

21. The controller of claim 13, wherein to select, based on the type of switch selected for each VNF of the plurality of VNFs and based on the network description data, a computing device of the plurality of computing devices to execute the VNF, the controller is configured to:
select the computing device in response to determining, based on the network description data indicating a type of switch that is configured within the computing device, the type of switch selected for the VNF is configured within the computing device.

22. A non-transitory computer-readable storage medium comprising instructions for causing one or more processors of a controller to:
obtain, for network function virtualization infrastructure (NFVI), network description data indicating, for each computing device of a plurality of computing devices of the NFVI, one or more types of switches for virtual network packet switching that are configured within the computing device, wherein the plurality of computing devices comprise servers of the NFVI;
receive a network service descriptor that specifies a plurality of virtualized network functions (VNFs);
select, for each VNF of the plurality of VNFs, a type of switch to be used to switch packets sent by or to be received by the VNF, wherein the type of switch is selected from a plurality of different types of switches that each applies a different switching method and that perform virtual network packet switching within at least one of the plurality of computing devices of the NFVI;
select, based on the type of switch selected for each VNF of the plurality of VNFs and based on the network description data, a computing device of the plurality of computing devices to execute the VNF; and
configure, for each VNF of the plurality of VNFs, the selected computing device to use the type of switch selected for the VNF.

23. The non-transitory computer-readable storage medium of claim 22, wherein to select, based on the type of switch selected for each VNF of the plurality of VNFs and based on the network description data, a computing device of the plurality of computing devices to execute the VNF, the one or more processors of the controller:
select the computing device in response to determining, based on the network description data indicating a type of switch that is configured within the computing device, the type of switch selected for the VNF is configured within the computing device.

* * * * *